United States Patent
Schoofs et al.

(10) Patent No.: US 7,626,369 B2
(45) Date of Patent: Dec. 1, 2009

(54) SWITCH MODE POWER CONVERTER

(75) Inventors: Franciscus Adrianus Cornelis Maria Schoofs, Eindhoven (NL); Johan Christiaan Halberstadt, Nijmegen (NL)

(73) Assignee: NXP B.V., Eindhoven (NL)

( * ) Notice: Subject to any disclaimer, the term of this patent is extended or adjusted under 35 U.S.C. 154(b) by 249 days.

(21) Appl. No.: 10/572,981

(22) PCT Filed: Sep. 16, 2004

(86) PCT No.: PCT/IB2004/051779
§ 371 (c)(1),
(2), (4) Date: Mar. 21, 2006

(87) PCT Pub. No.: WO2005/031956
PCT Pub. Date: Apr. 7, 2005

(65) Prior Publication Data
US 2007/0035284 A1 Feb. 15, 2007

(30) Foreign Application Priority Data
Sep. 25, 2003 (EP) .................................. 03103554

(51) Int. Cl.
*G05F 1/00* (2006.01)
(52) U.S. Cl. ....................................... 323/282; 323/266
(58) Field of Classification Search ................. 323/283, 323/266, 275, 280, 281, 282, 285, 290, 295
See application file for complete search history.

(56) References Cited

U.S. PATENT DOCUMENTS

| 5,432,431 | A | * | 7/1995 | Vinciarelli et al. | .......... 323/222 |
|---|---|---|---|---|---|
| 5,625,275 | A | * | 4/1997 | Tanikawa et al. | ............ 320/160 |
| 5,986,437 | A | * | 11/1999 | Lee | ............................. 320/162 |
| 6,218,820 | B1 | * | 4/2001 | D'Arrigo et al. | ............ 323/285 |
| 6,424,129 | B1 | | 7/2002 | Lethellier | |
| 7,122,995 | B2 | * | 10/2006 | Hasegawa et al. | ........... 323/272 |
| 7,279,878 | B2 | * | 10/2007 | Ootani et al. | ................ 323/285 |
| 7,315,153 | B2 | * | 1/2008 | Tazawa et al. | ............... 323/272 |
| 2003/0214276 | A1 | * | 11/2003 | Bernardon | ................... 323/282 |
| 2005/0035748 | A1 | * | 2/2005 | Inn | ............................. 323/285 |
| 2007/0279024 | A1 | * | 12/2007 | Falvey et al. | ................ 323/280 |

\* cited by examiner

*Primary Examiner*—Bao Q Vu
*Assistant Examiner*—Nguyen Tran

(57) ABSTRACT

A load line regulated switched-mode power converter supplies an output voltage and an output current to a load. The power converter includes an inductor, a switch coupled to the inductor, a first impedance, a second impedance, and a power converter controller. The power converter controller includes a first sense circuit to obtain momentary information on a first current which flows through the first impedance, and which is related to the output current. A difference between a zero load voltage and the output voltage is determined to obtain a difference level. A second sense circuit supplies further information on a second current which flows through the second impedance, and which is related to the first current. An integrator integrates a difference between the further information and the difference level to obtain a correction signal. A switch controller receives the difference level, the momentary information and the correction signal to control the switch to obtain a substantially zero correction signal in a steady state.

12 Claims, 10 Drawing Sheets

Figure 1:
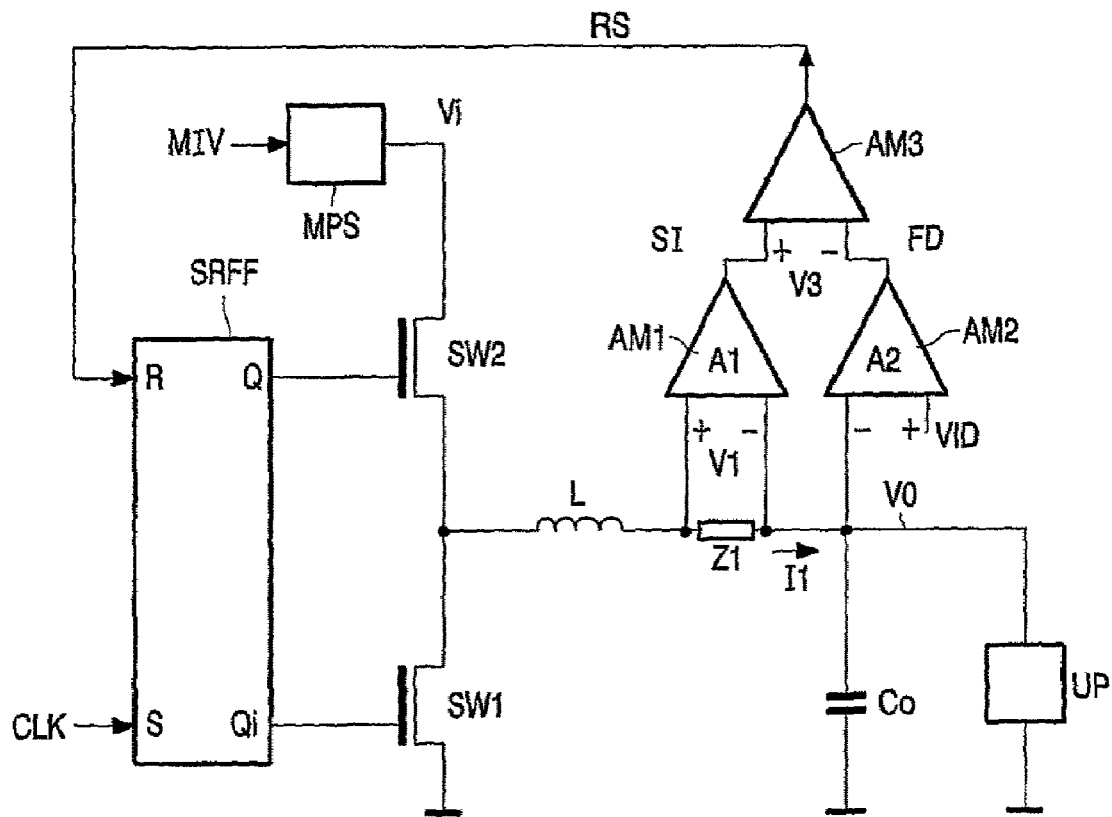

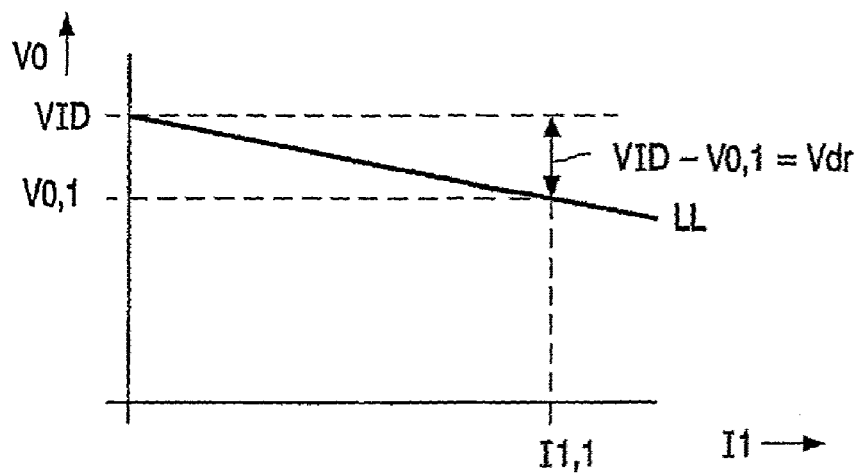
FIG. 2A
(Prior Art)
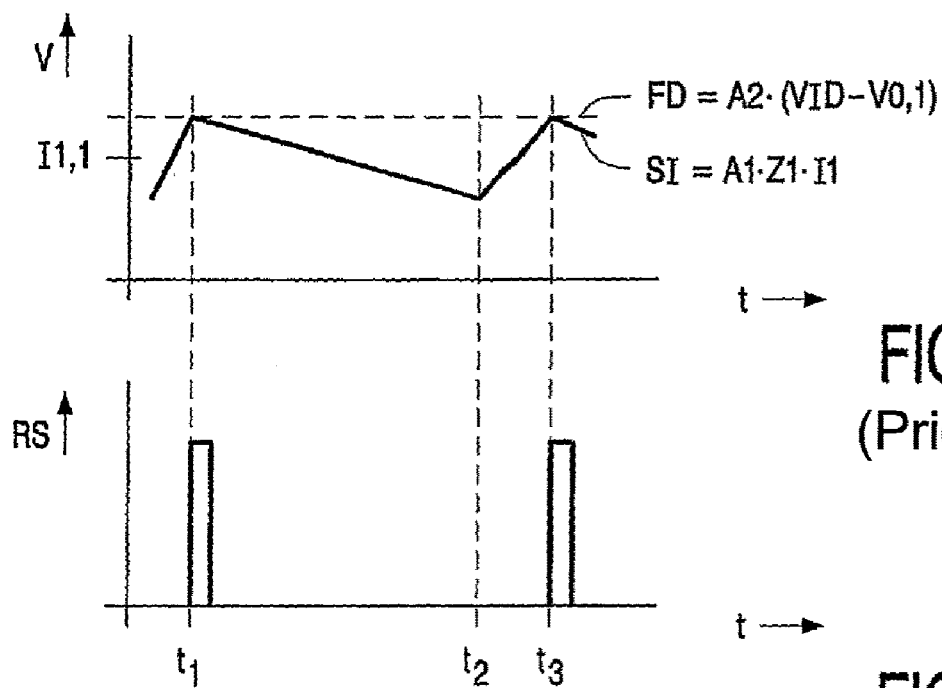
FIG. 2B
(Prior Art)
FIG. 2C
(Prior Art)

SWITCH MODE POWER CONVERTER

The invention relates to a load line regulated switched mode power converter, a multiphase switched mode power converter comprising several of such switched mode power supplies, an electronics apparatus comprising the switched mode power converter or the multiphase switched mode power converter, a power controller for controlling the power converter, and a power converter controller for controlling the multiphase switched mode power converter.

The power supply voltage of a processor in a personal computer, further referred to as PC, is currently generated by a series arrangement of a first power converter unit which converts the mains voltage into a stabilized DC-voltage of 5V or 12V, and a second power converter which converts this DC-voltage into a power supply voltage for the processor. The second power converter is preferably positioned near the processor and has to supply a low output voltage of, for example, 1.5 V. This second power converter is commonly referred to as Voltage Regulator (VR), Voltage Regulator Module (VRM), Voltage Regulator Down (VRD), or Point Of Load (POL) converter. Hereinbelow the abbreviation VRM is used.

The power to be supplied to existing and expected processors for PCs needs to fulfill very tight characteristics. The VRM output current range should cover 5 A to 100 A, and the VRM should be able to supply current to the output buffer capacitors at a rate up to 50 A/μs whereas the processor may ramp up the load current at a rate of 400 A/μs. The required output impedance of the VRM is defined by a load line which indicates the slope of the voltage-current characteristic at the output of the VRM. To be able to fulfill the strict requirement with respect to the load line, an accurate measurement of the output current in the VRM and the output voltage of the VRM is required.

The integrated VRM controller of Semtech, commercially available with type number SC2433, operates in current control mode. This controller is able to operate several down-converter output stages in parallel. The on-times of the different output stages are equidistantly shifted with respect to each other such that each of them supplies current from the input to the load during shifted periods in time with respect to each other. This minimizes the ripple of the output voltage. The current in the inductors is sensed with a single sense resistor in the 12V input line of the VRM. When no overlap of the phases of the different down-converters occurs, the single sense resistor provides information on the current flowing during the successive phases. This provides an inherently good load sharing and over-current protection. An error amplifier amplifies the difference between a reference voltage and the actual output voltage of the VRM to obtain an error voltage. The reference voltage is the voltage the converter should supply at zero load. Each of the down converters comprises a control FET and a sync FET of which the main current paths are arranged in series to receive a DC-input voltage. An inductor is connected between the junction of the main current paths and the output load. The control FET is arranged between the DC-input voltage and the inductor. The use of a single current sense resistor in the power supply input line allows for measurement of the value of the current in the input line. However, the shape of the current in the input line shows very steep and large steps because the control FET switches the complete inductor current. The parasitic inductance of the sense resistor introduces error voltages which are difficult to filter. These effects will cause an inaccurate control of the power converter leading to deviations from the required load line. In addition the relatively long distance from the drains of the control FETs to this single sense resistor introduces large parasitic inductances which cause a high amount of ringing.

It is an object of the invention to provide a power converter with an improved accuracy of the load line behavior.

A first aspect of the invention provides a switched mode power converter as claimed in claim 1. A second aspect of the invention provides a multiphase switched mode power converter as claimed in claim 23. A third aspect of the invention provides an electronic apparatus as claimed in claim 24. A fourth aspect of the invention provides a power converter controller for controlling the power converter as claimed in claim 26. A fifth aspect of the invention provides a power converter controller for controlling a multiphase switched mode power converter as claimed in claim 27. Advantageous embodiments of the invention are defined in the dependent claims.

The switched mode power converter in accordance with the first aspect of the invention has a load line regulation. A controller controls a switch which is coupled to an inductor in the usual manner to obtain a periodically changing current through the inductor. The power converter controller comprises a first sense circuit to obtain momentary information on a first current flowing through a first impedance. The first current is related to the output current to be able to use the momentary information for regulating the power converter. The momentary information may be an analog current or voltage, or a sequence of numbers representing the analog current or voltage.

The difference between a reference voltage and the output voltage is called the difference signal. The reference voltage is related to the zero-load voltage the power converter has to supply according to the load line. A second sense circuit obtains further information on a second current flowing through a second impedance. The second current is related to the first current and thus to the output current. An integrator integrates a difference between the further information and the difference signal to obtain a correction signal. The further information may be an analog current or voltage or a sequence of numbers representing the analog current or voltage.

A switch controller controls the switch by using the difference signal, the momentary information and the correction signal. The difference signal and the momentary information are used in the well-known manner to obtain a current regulated power converter. The correction signal is used to influence the switch controller to obtain a substantially zero correction signal in a steady state.

Thus, an extra current sensing is provided which is used to correct an error made in the usual sensing of the current. The usual sensing of the current is the sensing of the first current which provides momentary information on the current in the power converter to be able to regulate the power converter with a fast control loop. The extra current sensing is the sensing of the second current which provides the further information. Due to the integrating action, this further information averages disturbances in the voltage across the second impedance and thus provides a more accurate representation of the current in the converter. However, this averaged representation of the current in the converter cannot be used in the fast control loop to obtain a fast reaction on current variations. This averaged representation is used to correct the inaccurate amplitude or level of the momentary current. As will become clear, this may be reached in several manners. It is not required to actually correct the amplitude of the sensed momentary current.

The usual fast control loop can be realized with fast and inaccurate circuits. The inaccuracy of the fast circuits is corrected with the slow correction loop. The low bandwidth circuits of the slow correction loop can be made very accurate with less effort than the fast circuits of the fast control loop.

In an embodiment in accordance with the invention as claimed in claim 2, the momentary information has a bandwidth suitable to use the momentary information for instantaneous regulation of the power converter. As is known, the momentary information on the current is used to control the power converter during each switching cycle by switching off the switch when this current reaches the level of the difference signal. The further information has a bandwidth lower than the bandwidth of the momentary information such that disturbances on the second current are minimized by integration. Thus, the control loop which uses the difference between the further information and the difference signal to control the switch to correct for the inaccurate level of the momentary information is a relatively slow loop. The slow control loop is able to determine the value of the further information accurately because disturbances are integrated. Furthermore, the lower bandwidth circuits can be designed more readily to obtain a high accuracy. As the second current is related to the first current, the value of the second current is representative of the value of the first current.

In an embodiment in accordance with the invention as claimed in claim 3, the switch controller comprises a driver which receives a first driver signal and a second driver signal to operate the switch when a level of the first driver signal reaches a level of the second driver signal. Usually, in the down-converter, the switch is the control switch, which is switched off at substantially the instant the first driver signal becomes equal to the second driver signal. However, in another power supply topology, another switch may be involved which is either switched off or on. A correction circuit receives the correction signal to correct either:

(i) the momentary information to obtain a corrected momentary information. The first driver signal is the corrected momentary information and the second driver signal is the difference signal. Thus, the control switch is switched off at the instant the corrected value of the current sensed reaches the level of the difference of the zero load voltage and the output voltage.

(ii) the difference signal to obtain a corrected difference signal. The first driver signal is the momentary information and the second driver signal is the corrected difference signal. Thus, the control switch is switched off at the instant the value of the current sensed reaches the level of the corrected difference of the zero load voltage and the output voltage.

(iii) the momentary information to obtain a corrected momentary information and the difference signal to obtain a corrected difference signal. Now, the first driver signal is the corrected momentary information and the second driver signal is the corrected difference signal.

In an embodiment in accordance with the invention as claimed in claim 4, a multiplier receives the difference signal and the correction signal to supply the corrected difference signal. The multiplier multiplies the difference signal by a factor determined by the correction signal. Or, in other words, the level of the difference signal is multiplied by a factor determined by the correction signal to obtain a corrected level.

In an embodiment in accordance with the invention as claimed in claim 5, a multiplier receives the momentary information and the correction signal to supply the corrected momentary information. The multiplier multiplies the momentary information by a factor determined by the correction signal. Or, in other words, the amplitude of the momentary information is controlled by the correction signal.

In an embodiment in accordance with the invention as claimed in claim 6, an offset introducing circuit receives the difference signal and the correction signal to supply the corrected difference signal. The offset introducing circuit causes a DC-shift of the difference signal by an amount determined by the correction signal. Or, in other words, the level of the difference signal gets an offset of a factor determined by the correction signal.

In an embodiment in accordance with the invention as claimed in claim 7, an offset introducing circuit receives the momentary information and the correction signal to supply the corrected momentary information. The offset introducing circuit causes a DC-shift of the momentary information by an amount determined by the correction signal.

In an embodiment in accordance with the invention as claimed in claim 8, the power converter controller comprises a load determining circuit to determine a load condition of the power converter. The integrator determines the correction signal only when the load condition is above a predetermined load condition. If the load condition is above this predetermined load condition at which the load is substantially higher than zero, the load line will be corrected for a relatively high output current. Such a correction action has an effect predominantly on the slope of the load line and little effect on the output voltage at low current.

In an embodiment in accordance with the invention as claimed in claim 9, the power converter controller comprises a load determining circuit to determine a load condition of the power converter. The integrator determines the correction signal only when the load condition is below a predetermined load condition. If the load condition is below this predetermined load condition at which the load is near to zero, the load line will be corrected for a relatively low output current. Such a correction action has an effect predominantly on the starting value of the load line and substantially no effect on the slope of the load line. Consequently, the DC-offset of the load line is adjusted.

In an embodiment in accordance with the invention as claimed in claim 10, the power converter controller uses the slow loop to control both the DC-offset and the slope of the load line. The DC-offset is controlled by the integrated signal determined at low load conditions. The slope is controlled by the integrated signal determined at high load conditions. This provides a very accurate control of the load line.

In an embodiment in accordance with the invention as claimed in claim 11, the different control signals determined by the integrator during the different periods in time corresponding to the different output load conditions are stored. Both control signals are continuously available to control the multiplier and the offset determining circuit with the values stored during the correct period in time. The slow control loops for offset and gain adjustment can be separate circuits or can apply circuits in common since the correction of the adjustment signals is done at different load conditions and thus in different time slots.

In an embodiment in accordance with the invention as claimed in claim 12, the load condition of the power converter is determined by comparing the level of the output voltage with reference levels, the level of the output current or a current related to the output current with reference levels, or the level of the difference signal with reference levels.

In an embodiment in accordance with the invention as claimed in claim 13, the first impedance and the second impedance are the same impedance and consequently the first current and the second current are the same current. The first sense circuit obtains the momentary information of this current with relatively high bandwidth, and the second sense circuit obtains the further information with a relatively low bandwidth. Thus, the further information is an averaged or integrated version of the momentary information. The momentary value of the current through the sense impedance is used to regulate the power converter in a fast control loop. The averaged value of the current through the sense impedance is used to correct the fast control loop such that the error in the momentary sensed current is decreased. This embodiment has the advantage that only a single sense resistor is required.

In an embodiment in accordance with the invention as claimed in claim 14, the first impedance is the impedance of the main current path of the switch. If the switch is a FET, this impedance is referred to as Rds-on. The value of the Rds-on shows a relatively large spread and temperature sensitivity. The voltage across the drain source of the FET can be used in the fast control loop as it is a momentary representation of the current in the converter and is related to the output current of the converter. The voltage across the FET is only useful when the FET is on. The further information is used to correct for the inaccuracy of the voltage across the FET. The integration of the difference of the further information and the difference signal is meaningful only during the on-period of the FET. It is possible to gate the integrator such that it integrates only during this on-period, or it is possible to gate the signals supplied to the integrator such that they have a zero value outside the on-period.

This embodiment has the advantage that the intrinsic, already available, resistance of the switch is used. The inaccuracy of this resistance is corrected by using an extra resistance. As the bandwidth of processing the information across the extra resistance is relatively low, the problem caused by parasitics will be less.

In an embodiment in accordance with the invention as claimed in claim 15, the first impedance is arranged in series with the inductor. The first impedance may be an inaccurate discrete resistor or a track in an IC or on a printed board. The value of this resistor may have (a) relatively large: spread, parasitic elements, and temperature sensitivity. The voltage across the resistor is used in the fast control loop as it is a momentary representation of the current in the converter and is related to the output current of the converter. As is common with the application of resistors for current sensing, some filtering of the signal across the resistor may be applied in order to reduce the unwanted signals caused by parasitics. However, it is not required to compensate as accurately as would normally be necessary. The further information is used to correct for the inaccuracy of the voltage across the resistor.

In an embodiment in accordance with the invention as claimed in claim 16, the second impedance is arranged between an input of the power converter and a main current path of the switch SW2 to sense an average input current of the power converter. This average current is related to the average output current by the output and input voltage ratio and the efficiency of the converter. The second impedance has the advantage that the frequency spectrum of the input current is low frequent with respect to the output current or the current through the switches. Further, the RMS value of the input current is lower, and thus a cheaper resistor can be used.

In an embodiment in accordance with the invention as claimed in claim 17, the switched mode power converter comprises a well-known down-converter with a control switch and a sync switch. The common resistor is arranged in series with the main current path of the control switch.

In an embodiment in accordance with the invention as claimed in claim 19 or 22, the second sense circuit and the difference determining circuit supply currents which are integrated on a capacitor to obtain the correction signal. Usually, a first capacitor is required for the gain adjustment, and a second capacitor is required for the offset adjustment. This has the advantage that the integrator for integrating the difference is very simple. Instead of a capacitor a more complex integrating network may be used.

In an embodiment in accordance with the invention as claimed in claim 20, the second impedance carries an average current. This has the advantage that this current is valid during the complete switching period.

The multiphase switched mode power converter in accordance with the second aspect of the invention has the advantage that only a single accurate sensing of the total current of the multiphase switched mode power converter is required. This accurate sensing is used to correct for the inaccurate sensing performed in each one of the switched mode power converters of the multiphase switched mode power converter. The inaccurate sensing in each of the switched mode power converters is performed to be able to control each of these switched mode power converters with a fast control loop.

These and other aspects of the invention are apparent from and will be elucidated with reference to the embodiments described hereinafter.

Figure 3:
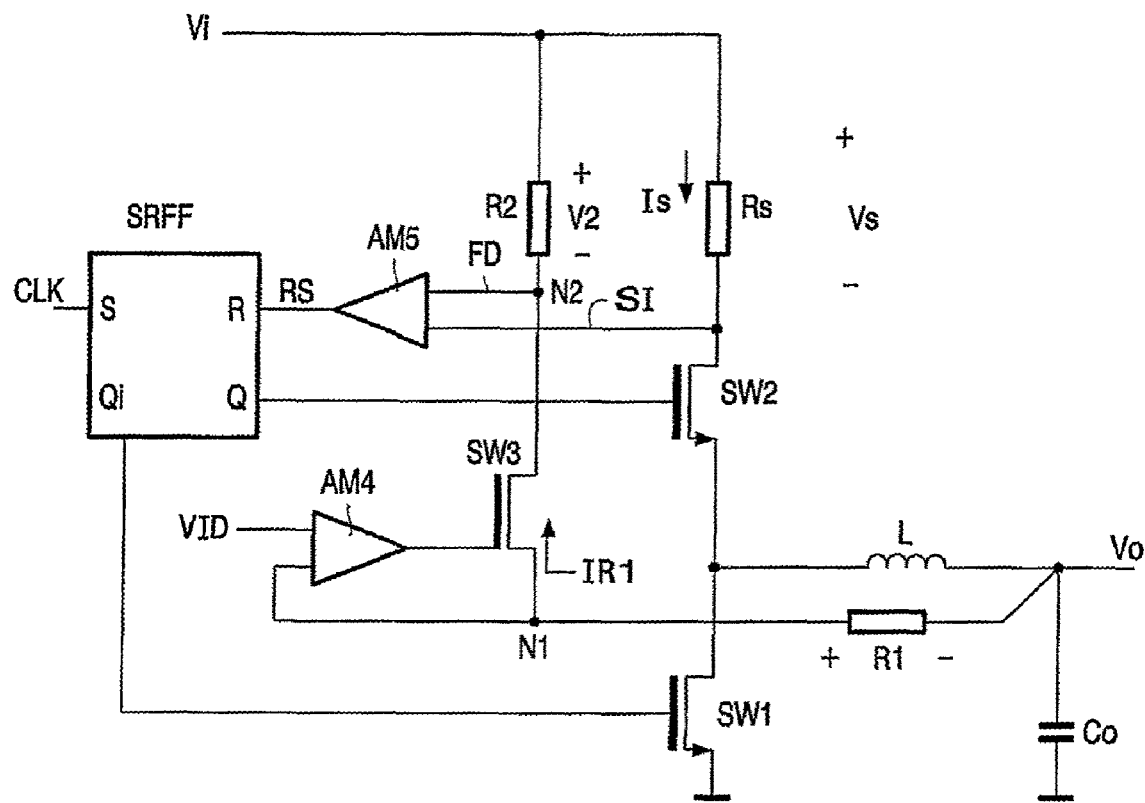
Figure 4:
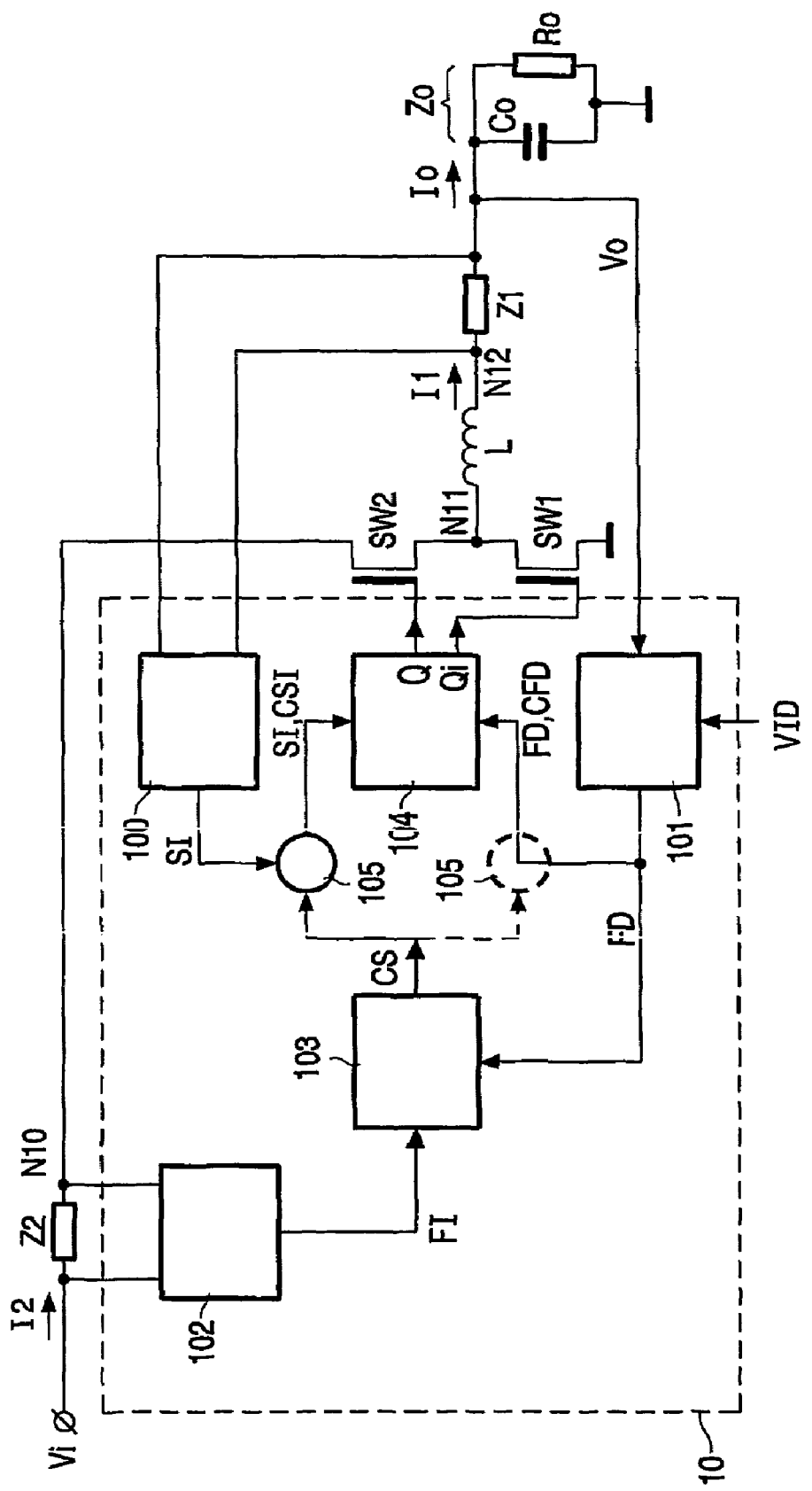
Figure 5:
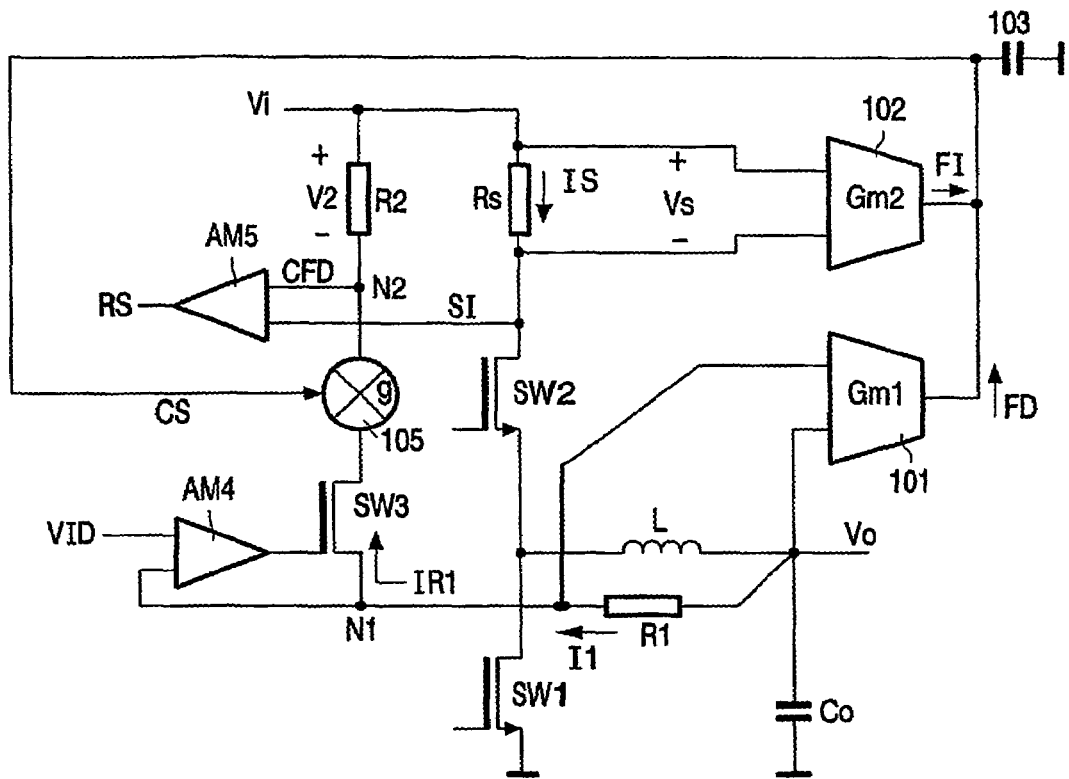
Figure 6:
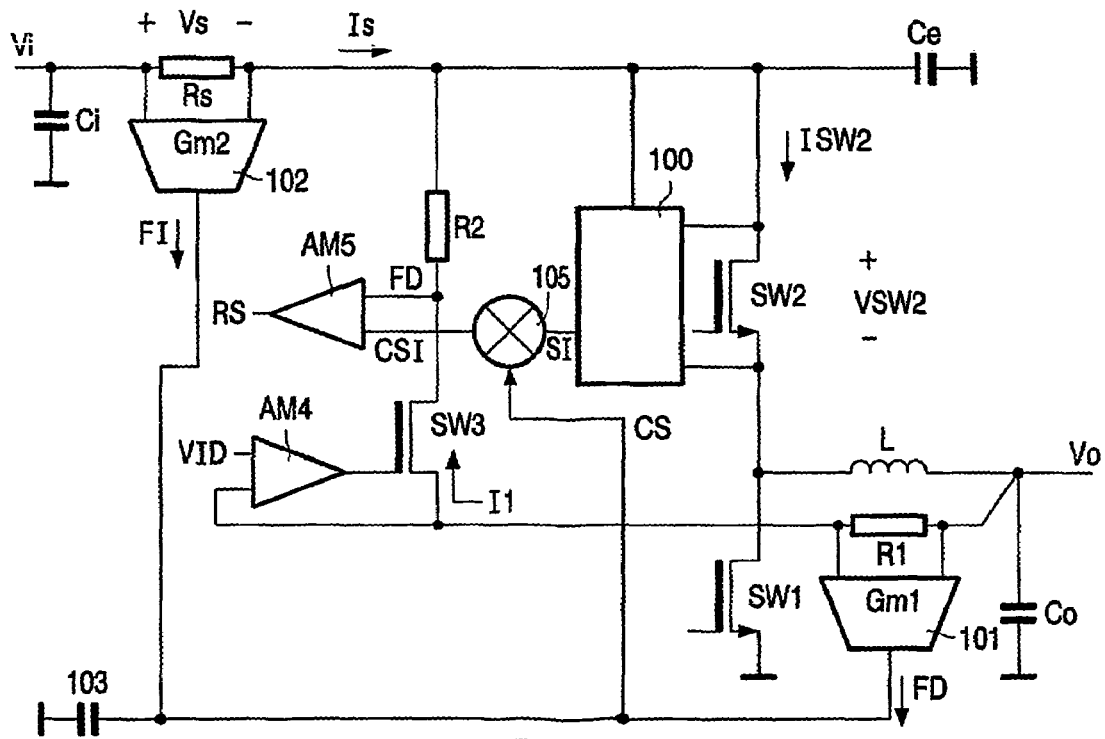
Figure 7:
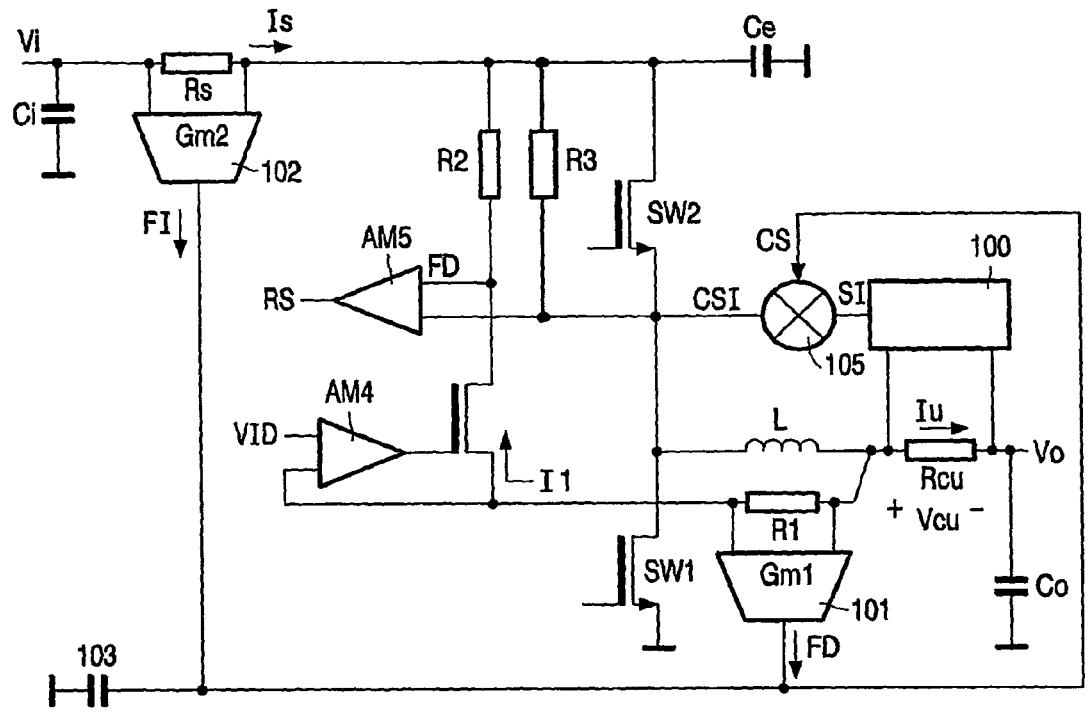
Figure 8:
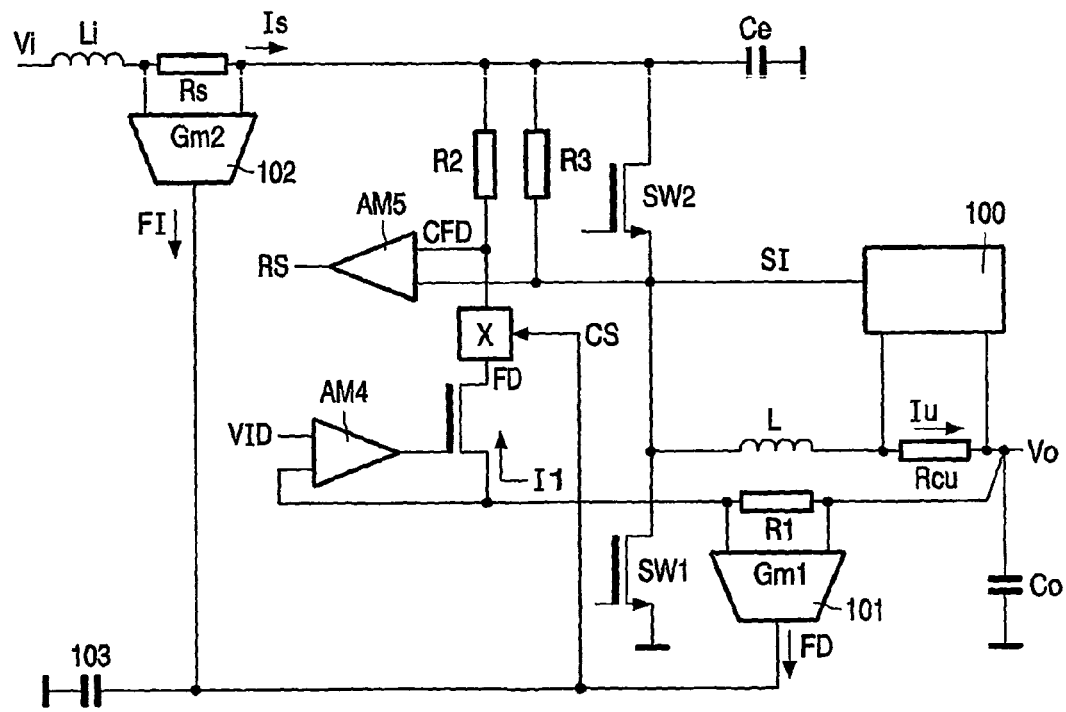
Figure 9:
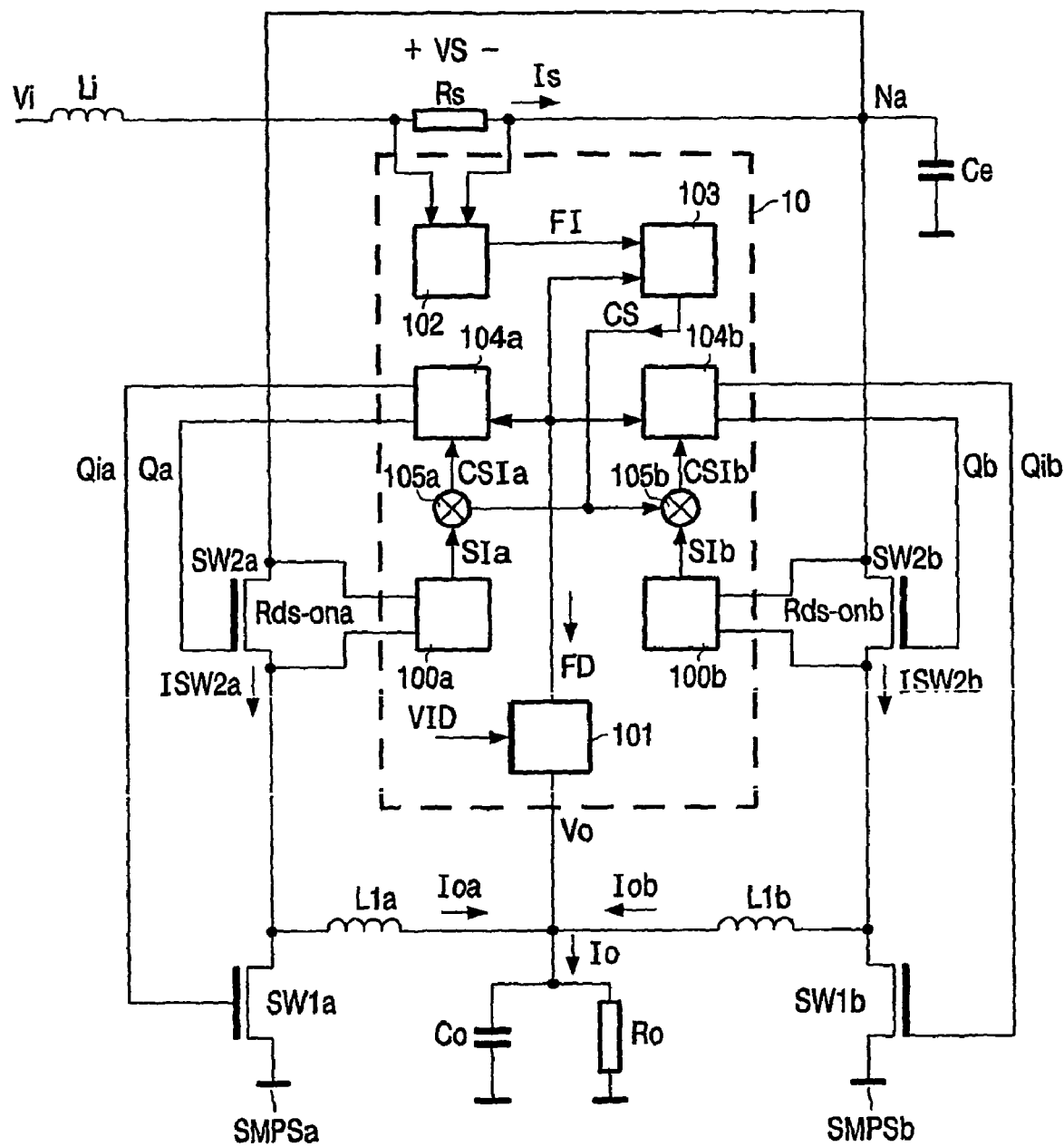
Figure 10:
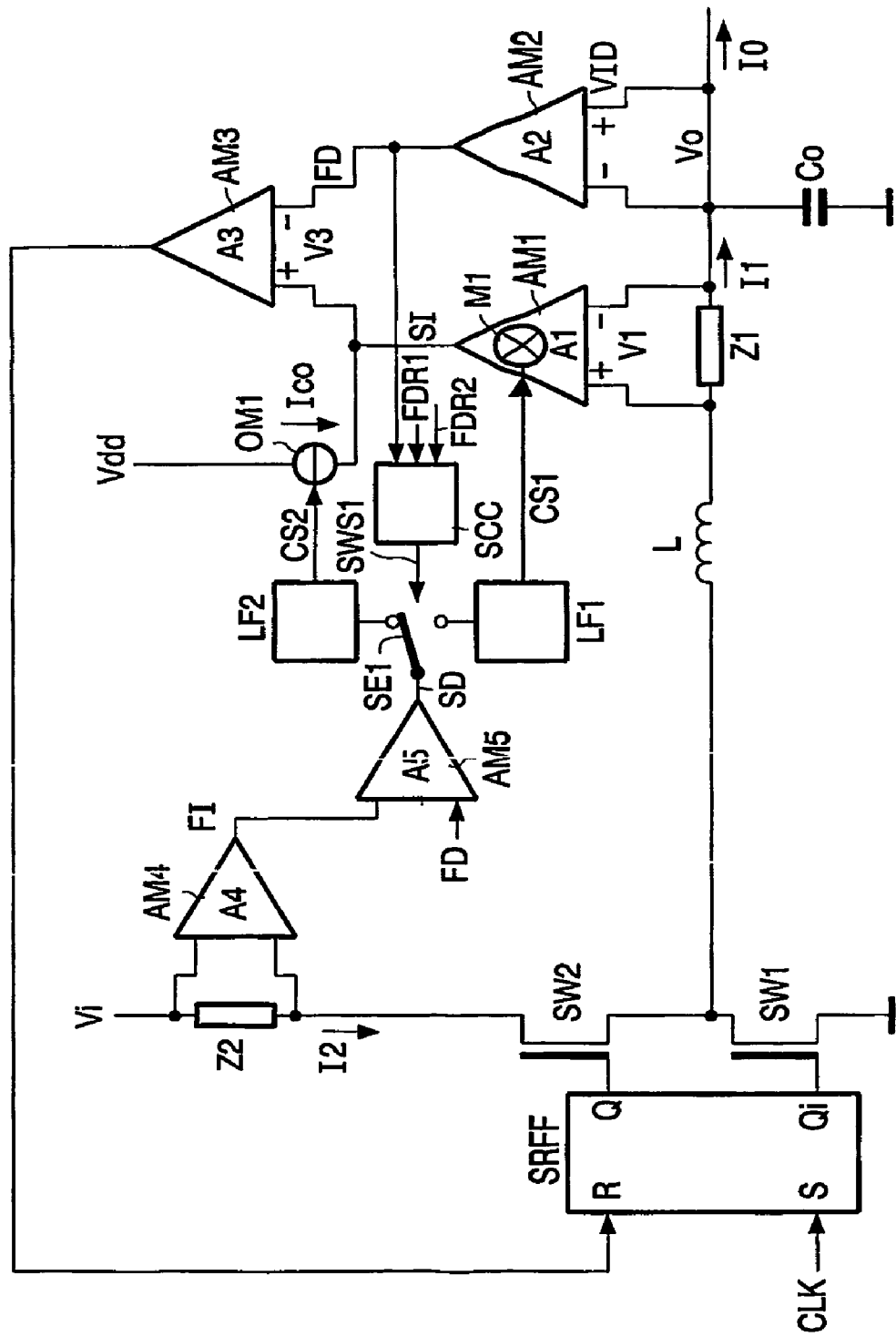
Figure 11:
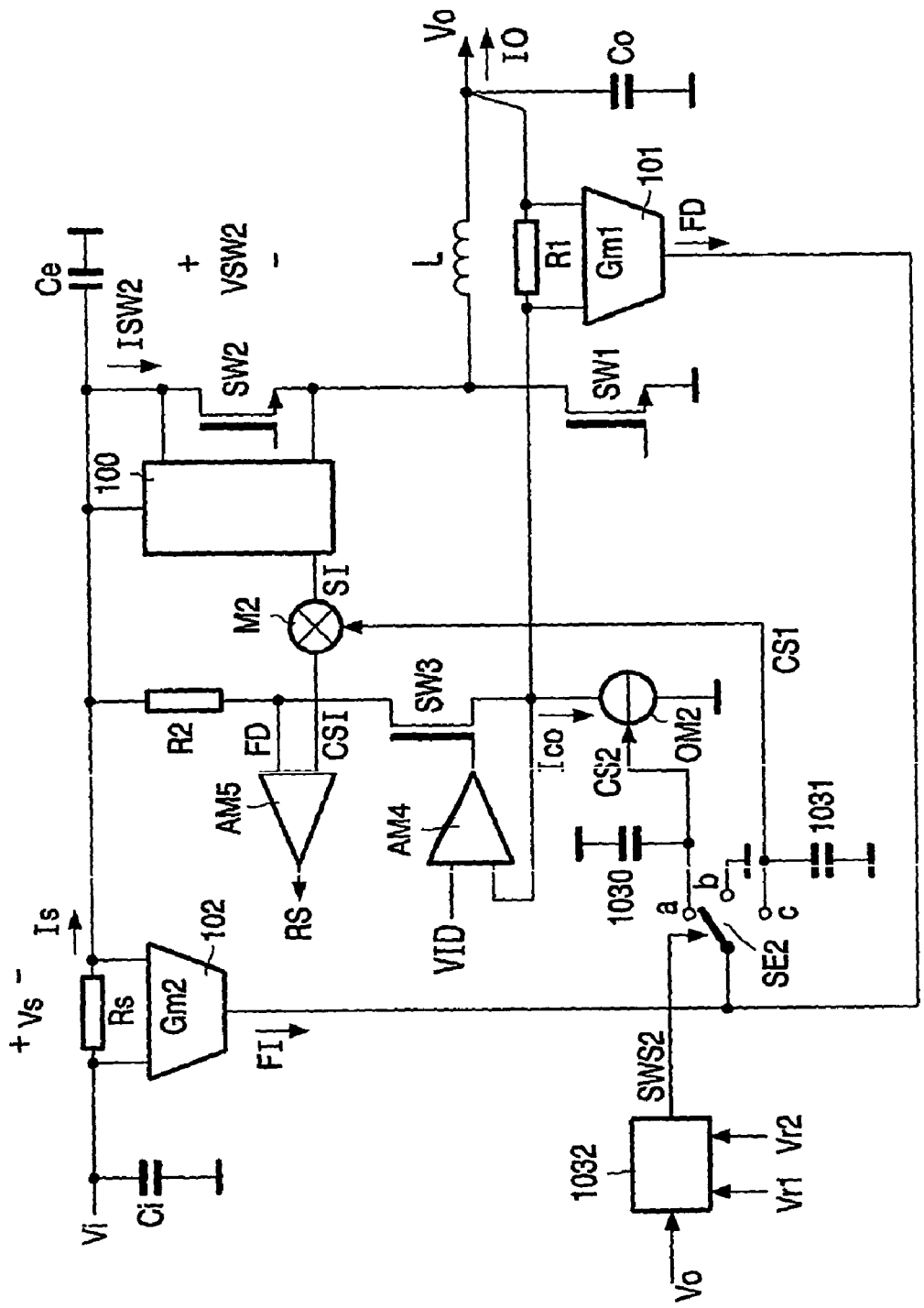
Figure 12:
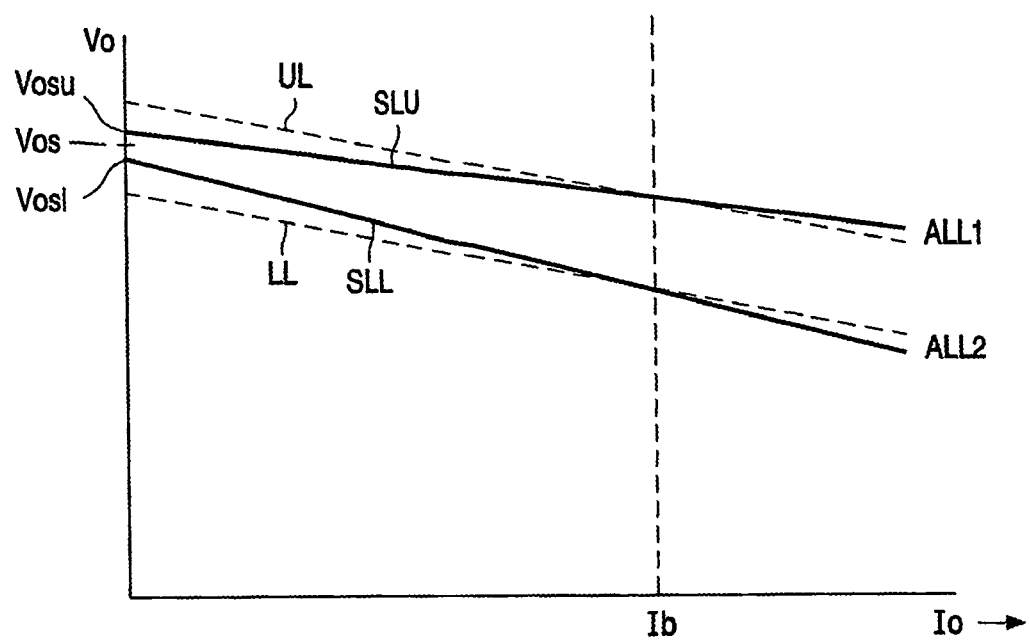
Figure 13:
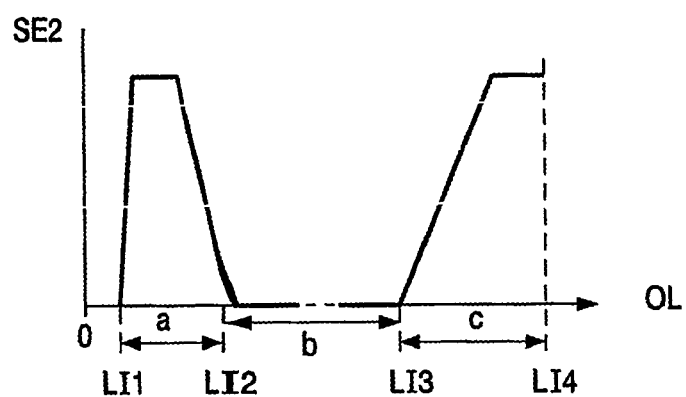
Figure 14:
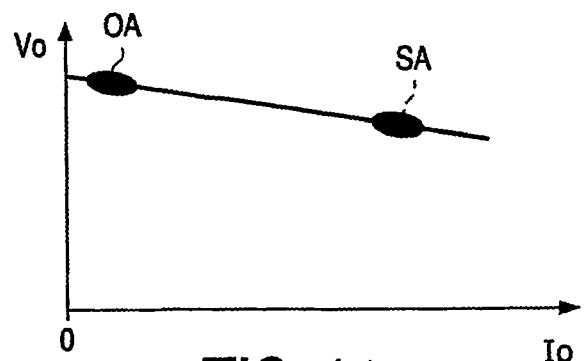

In the drawings:

FIG. 1 shows a circuit diagram of a prior art electronics apparatus with a current-mode controlled down-converter including a load line regulation, FIG. 2 shows signals in the prior art current-controlled down-converter to elucidate its operation, FIG. 3 shows another circuit diagram of a prior art current-controlled down-converter including a load line regulation, FIG. 4 shows a circuit diagram of a current-controlled down-converter in accordance with an embodiment of the invention, FIG. 5 shows a circuit diagram of a current-controlled down-converter in accordance with an embodiment of the invention, FIG. 6 shows a circuit diagram of a current-controlled down-converter in accordance with an embodiment of the invention, FIG. 7 shows a circuit diagram of a current-controlled down-converter in accordance with an embodiment of the invention, FIG. 8 shows a circuit diagram of a current-controlled down-converter in accordance with an embodiment of the invention, and FIG. 9 shows a circuit diagram of a multi phase current-controlled down-converter in accordance with an embodiment of the invention, FIG. 10 shows a circuit diagram of a current controlled down-converter in accordance with an embodiment of the invention, FIG. 11 shows a circuit diagram of a current controlled down-converter in accordance with an embodiment of the invention, FIG. 12 shows load line tolerances, FIG. 13 shows the operation of the slow control loop dependent on the load condition of the power converter, and FIG. 14 shows the offset and slope adjustment of the load line with the slow control loop.

FIG. 1 shows a prior art consumer electronics apparatus with a peak-current-mode controlled down-converter including a load line regulation. A main power supply MPS receives a mains input voltage MIV and supplies a DC-input voltage Vi to the current-controlled down-converter which is further referred to as power converter. The DC-input voltage Vi is received across a series arrangement of the main current paths of a control FET SW2 and a sync FET SW1. A series arrangement of an inductor L and a sense impedance Z1 is arranged between the junction of the main current paths and the output of the power converter which supplies the output voltage Vo across a circuit UP of the electronic apparatus. The circuit UP may be a microprocessor. A capacitor Co is connected to the output of the power converter. The sense impedance Z1 usually is a discrete resistor of high quality. This resistor must allow an accurate current sensing. By accurate current sensing is meant that the shape and the value of the voltage V1 across the sense impedance Z1 is sufficiently accurate to be able to control the fast control loop which regulates the power converter. Such a high quality resistor must thus have a low parasitic inductance, and has to be able to withstand a high power. For high accuracy, so-called four point sensing has to be used. All these requirements cause the sense resistor to become an expensive and problematic element.

The fast control loop comprises the operational amplifiers AM1, AM2, AM3 and the set-reset flip-flop SRFF. The amplifier AM1 has inputs connected across the sense impedance Z1 and thus senses the voltage V1 caused by the current I1 flowing through the sense impedance Z1. The voltage V1 across the sense impedance Z1 is influenced by parasitic effects such as caused by a series inductance of the sense impedance Z1. If the amplifier AM1 has an amplification factor A1, the output voltage SI of this amplifier AM1 is the multiplication of A1, Z1 and I1. The amplifier AM2 has an inverting input connected to the output of the power converter to receive the output voltage Vo, a non-inverting input to receive a reference voltage VID and an output to supply the output voltage FD. The reference voltage VID is selected to be the no-load voltage of the power converter dictated by the required load line, apart from an offset introduced due to the application of the peak-current-mode control principle. This effectively implies a no-load output voltage Vo unequal to the reference voltage VID. Known measures such as the insertion of a compensation voltage- or current-source proportional to the ripple current value can be applied for making the no-load output voltage equal to VID. This known deviation and its solution are neglected in the further description and the term no-load should be interpreted accordingly. If the amplifier AM2 has an amplification factor A2, the output voltage is FD=A2 (VID−Vo). Thus, the output voltage SI of the amplifier AM1 is the momentary information on the current I1 through the sense impedance Z1 and the output voltage FD is the difference signal.

The amplifier A3 has an inverting input to receive the difference signal FD, a non-inverting input to receive the momentary information SI, and an output to supply a reset signal RS. The set-reset flip-flop SRFF has a reset input R which receives the reset signal RS, a set input S which receives a clock signal CLK, a non-inverting output Q coupled to the gate of the control FET SW2, and an inverting output Qi coupled to the gate of the sync FET SW1. The operation of the power converter will be elucidated with respect to FIG. 2.

FIG. 2 shows signals in the prior art current-controlled down-converter to elucidate its operation.

FIG. 2A shows the output voltage Vo versus the output current I1 graph indicating a required load line LL. The load line LL starts at a zero value of the output current I1 at the no-load value VID. For the value I1,1 of the output current I1, the output voltage Vo should have the value Vo,1. The difference between the no-load value VID and the value Vo,1 is called the droop voltage Vdr.

FIG. 2B shows the output signals SI and FD of the amplifiers AM1 and AM2, respectively, as a function of time. The sawtooth shaped momentary information SI represents the sawtooth shaped current I1 through the sense impedance Z1 if this sense impedance is an ideal resistor. The current I1 decreases during the off-period of the control FET SW2 and increases during the on-period of the control FET SW1. The off-period lasts from instant t1 to instant t2. The on-period lasts from instant t2 to instant t3. The off-period lasts relatively long with respect to the on-period because the power converter is a down converter of which the ratio between the output voltage Vo and the input voltage Vi is relatively small. The control FET SW2 and the sync FET SW1 receive inverse control signals Q and Qi at their respective gates. Thus, the sync FET is conductive when the control FET is switched off, and the sync FET is non-conductive when the control FET is switched on.

The start of the on-period at the instant t2 is determined by the clock signal CLK which sets the set-reset flip-flop SRFF. Usually, the clock signal CLK is a repetitive signal with a fixed repetition period, and usually it is generated by an oscillator. The difference signal FD shows the momentary difference of the no-load reference voltage VID and the actual output voltage Vo. As shown in FIG. 2C, the amplifier AM3 supplies a reset pulse RS at the instants t1 and t3 when the level of the momentary information SI reaches the level of the difference signal FD. This reset pulse RS causes the set-reset flip-flop to reset its Q output and to set its Qi output, and the control switch SW2 is switched off.

Thus, the duration of the on-period of the control switch SW2 during which energy is stored in the inductor L, is determined by the instant the current I1 reaches a level which depends on the difference between the no-load output voltage VID and the actual output voltage Vo. In the example shown in FIG. 2, in a stable situation, the amplification factors A1 and A2 are selected such that at an average current I1,1 of the current I1, the output voltage Vo,1 occurs. For example, it is assumed that it is required that the droop voltage Vdr is 75 mV at an average current I1,1 of 50 A, and that the factors A1 and A2 have been selected accordingly. But, now assume that due to a temporary disturbance the droop voltage deviates from said 75 mV. This means for example that the difference level FD is much too high, the current I1 is allowed to rise much higher than required by the output load UP, this will cause the output voltage Vo to increase. Now, the difference FD decreases and thus the maximum level of the current I1 decreases. The output voltage Vo will change and the maximum level of the current I1 will decrease until, in the stable situation, the droop voltage Vdr is 75 mV again at an average value of the current I1 of 50 A.

If the output current I1 requested by the load increases, the actual level of the output voltage Vo decreases, thus the difference FD increases and the reset pulse RS is generated at a higher level of the current I1. Consequently, the on-period of the control switch SW2 increases and more energy is stored in the inductor L and thus the output voltage Vo will start to rise. The difference FD starts to decrease and the on-period decreases until a new stable situation is reached at a higher peak value of the current I1 and a higher difference FD, and thus at a lower value of the output voltage Vo, in accordance with the required load line.

FIG. 3 shows another prior art current-controlled down-converter. A DC-input voltage Vi is coupled across a series arrangement of the main current paths of a control FET SW2 and a sync FET SW1. An inductor L is arranged between the junction of the main current paths and the output of the power converter which supplies the output voltage Vo. A capacitor Co is connected to the output of the power converter. A sense resistor Rs is arranged in the drain path of the control FET SW2. An operational amplifier AM4 has an input coupled to a node N1, an input to receive the reference level VID, and an output coupled to a gate of a FET SW3. The FET SW3 has a source connected to the node N1, and a drain connected to a node N2. A resistor R1 is arranged between the node N1 and the output of the power converter. An amplifier AM5 has an input coupled to the node N2, an input coupled to the junction of the sense resistor Rs and the drain of the control FET SW2, and an output connected to the reset input R of a set-reset flip-flop SRFF. A resistor R2 is arranged between the node N2 and the input of the power converter at which the input voltage Vi is present. The set-reset flip-flop SRFF comprises a set input S to receive a clock signal CLK, a non-inverting output Q coupled to the gate of the control FET SW2, and an inverting output Qi coupled to the gate of the sync FET SW1. The current through the sense resistor Rs is indicated by Is, the current through the resistor R1 is indicated by IR1.

The amplifier AM4 has a high amplification factor such that in a steady state situation, the voltage at both its inputs is equal to the no-load voltage VID. Thus, the current IR1 through the resistor R1 is determined by the difference of the output voltage Vo and the reference voltage VID. This current IR1 causes a voltage level across the resistor R2 equal to $$V2=R2/R1(VID-Vo).$$

In fact, the voltage at the node N2 is information indicative of the difference between the reference voltage VID and the actual output voltage Vo and is referred to as the difference signal FD.

The voltage Vs across the sense resistor Rs has the shape of the current through the sense resistor Rs if the sensing of the voltage across the sense resistor Rs is perfect. In a practical implementation, the sense resistor Rs has a parasitic inductance which can be compensated by a low-pass filter. However, an optimal compensation by the low-pass filter is not possible due to tolerances. Such a low-pass filter may be a RC circuit between Vsense across Rs and the input of AM5. Thus, the voltage at the other input of the amplifier AM5 is information which is indicative of the current Is in the power converter and is referred to as the sense information SI.

The amplifier AM5 compares the sense information SI with the difference signal FD and resets the set-reset flip-flop SRFF at substantially the instant the level of the sense information SI reaches the level of the difference signal FD. The prior art current-controlled down-converter shown in FIG. 3 has a different topology than the prior art current-controlled down-converter shown in FIG. 1 but generates the reset signal RS in the same manner. The amplifier AM5 uses equivalent signals on its inputs as the signals on the inputs of the amplifier AM3 in FIG. 1. The operation of the prior art current-controlled down-converter shown in FIG. 3 is thus identical to the operation of the prior art current-controlled down-converter shown in FIG. 1.

FIG. 4 shows a current-controlled down-converter in accordance with an embodiment of the invention. The power converter comprises an input to receive the DC-input voltage Vi. A sense impedance Z2 is arranged between the input and a node N10. The main current path of the control FET SW2 is arranged between the node N10 and a node N11. The main current path of the sync FET SW1 is arranged between the node N11 and ground. The inductor L is arranged between the node N11 and a node N12. A sense impedance Z1 is arranged between the node N12 and the output of the power converter which supplies the output voltage Vo and the output current Io to the output impedance Zo which comprises the smoothing capacitor Co and the load Ro.

The sense circuit 102 senses the voltage across the sense impedance Z2 and supplies the information FI which is representative of the current I2 through the sense impedance Z2. The sense impedance Z2 is preferably a resistor. The sense circuit 101 supplies a difference signal FD which is representative of the difference between the reference voltage VID and the actual output voltage Vo. The reference voltage VID is the no-load value of the output voltage Vo as required by the load line. The integrator 103 integrates the difference of the information FI and the difference signal FD to supply a correction signal CS. The sense circuit 100 senses the voltage across the sense impedance Z1 and supplies the information SI which is representative of the current I1 through the sense impedance Z1.

The multiplier 105 has an input to receive the correction signal CS, an input to receive the information SI, and an output to supply corrected information CSI. The corrected information CSI is the information SI multiplied by a correction factor determined by the correction signal CS. Thus, the correction signal CS corrects the amplitude of the information SI. As in the prior-art down converters, the switch controller 104 receives the difference signal FD representative of the difference of the reference voltage VID. But instead of the information SI on the momentary current in the power converter, now the corrected information SI representative of the momentary current in the power converter multiplied by a correction factor is received. The switch controller 104 may again comprise the prior art set-reset flip-flop which is set by a clock signal and which is reset at substantially the instant the level of the corrected information CSI reaches the level of the difference signal FD.

In fact, the difference with the prior art is that the inaccurate sensing of the momentary current, which in FIG. 4 is the current I1, is made accurate by sensing another current I2 with a higher accuracy; this other current in FIG. 4 is I2. The other sensed current FI is compared with the difference signal FD and integrated to obtain a correction signal CS to correct the amplitude of the inaccurate current I1. The sensing of the current I1 must have a high bandwidth to obtain the information SI which has the correct shape resembling the shape of the current I1 as much as possible. This momentary current information SI is required in the fast regulation loop of the power converter. However, this fast loop is made more accurate by controlling the amplitude of the momentary current information SI with the correction signal CS. The correction signal CS preferably is determined with a slow loop which integrates the information FI to average disturbances on the current I2 and/or on the sensing of the voltage across the impedance Z2. The integrated or averaged control signal CS provides an approximation of the level of the current in the converter. The load line of the power converter is determined by the average current in the power converter instead of by the temporary current. If the temporary current is used, in fact the peak current is used. Further, the disturbances on the temporary current are not averaged and thus cause a further inaccuracy.

The multiplier 105 may be moved such that the information SI is supplied to the switch controller 104, and such that the difference signal FD is multiplied by the correction signal CS to obtain a corrected difference signal CFD. This position of the multiplier 105 is indicated by dashed lines. It is also possible to correct both the information SI and the difference signal FD to supply the corrected information CSI and the corrected difference signal CFD to the switch controller 104.

Although in FIG. 4 a down-converter with a control FET SW2 and a sync FET SW1 is shown, the invention is also relevant for other topologies of power supplies wherein accurate current sensing is required to be able to accurately obtain the required load line behavior of the power converter.

Although in FIG. 4 the difference signal FD is the same for both the fast control loop and the correction loop, it is possible to use different circuits to supply different difference signals. A low bandwidth circuit with high accuracy may be used to supply a very accurate difference signal FD to the integrator 103, while a high bandwidth circuit with lower accuracy is used to supply a fast, but less accurate difference signal to the switch controller 104.

FIG. 5 shows a current-controlled down-converter in accordance with an embodiment of the invention. FIG. 5 shows the implementation of the inventive idea shown in FIG. 4 on the down-converter topology shown in FIG. 3. The same items as in FIG. 3 have the same references. With respect to the power converter shown in FIG. 3, a sense circuit 101, a sense circuit 102, a capacitor 103, and a multiplier 105 are added.

The sense circuit 101 has an input coupled to receive the output voltage Vo of the power converter, an input coupled to the node N1 to receive the reference level VID, and an output to supply the difference signal FD as a difference current. The difference current FD is representative of the difference between the reference signal VID and the actual value of the output voltage Vo: FD=Gm1×(VID−Vo). The sense circuit 102 has two inputs coupled to receive the voltage Vs across the sense resistor Rs, and an output to supply the current information FI as information current. The information current FI is representative of the current Is through the sense resistor Rs: FI=Gm2×Rs×Is. The difference of the information current FI and the difference current FD is integrated on the capacitor 103 to obtain the correction voltage CS. The integrator 103 may of course comprise a more complex circuit than a single capacitor. The sense resistor Rs may also be arranged in series with the inductor L.

The multiplier 105 is inserted between the resistor R2 and the main current path of the FET SW3. The multiplier 105 multiplies the current IR1 through the resistor R1 by the correction factor g indicated by the correction voltage CS. Thus, the current through the resistor R2 is g×IR1 and the level at the node N2 is corrected such that the inaccurate current information SI is compared with a level at node N2 which decreases this inaccuracy.

Alternatively, the multiplier 105 may be inserted in the line carrying the signal SI to correct this signal with a correction factor dependent on the correction signal CS such that the inaccurate amplitude of this instantaneous representation of the current IS in the power converter is corrected by using the integrated difference of this same current and the difference voltage VID−Vo.

It has to be noted that the same sense resistor Rs is used both to obtain the momentary information SI to be used in the fast control loop of the power converter and to determine via the slow correction loop the correction factor for this fast control loop. The correction factor may be applied to the momentary information SI or on the difference signal FD. The correction loop is relatively slow with respect to the control loop because the capacitor 103 performs an integrating action. This integrating action provides a better average value of the current Is in the power converter and lowers the influence of parasitic disturbances. Thus, the correction factor is determined such that the inaccuracy of the momentary current can be compensated or at least decreased.

FIG. 6 shows a current-controlled down-converter in accordance with an embodiment of the invention. FIG. 6 shows the implementation of the inventive idea shown in FIG. 4 on the down-converter topology shown in FIG. 3. The same items as in FIG. 3 have the same references. With respect to the power converter shown in FIG. 3, a sense circuit 100, a sense circuit 101, a sense circuit 102, a capacitor 103, a capacitor Ce and a multiplier 105 are added.

The capacitor Ce is arranged at the junction of the control FET SW2 and the sense resistor Rs. In practice, this capacitor Ce has a large value since it serves for the local decoupling of the supply voltage. The current Is in FIG. 3 is a pulsed current, it is zero when the control FET SW2 is open, and it is substantially equal to the current through the inductor L if the control FET SW2 conducts. The current Is in FIG. 3 thus is a momentary current during the period in time the control FET SW2 conducts. The current Is in FIG. 6 is an average current, and is not representative of the momentary current through the inductor L. This current Is cannot be used in the fast control loop which regulates the power converter, the response of the power converter would become too slow. To obtain a fast response the momentary current through the inductor L is sensed at an appropriate position. This sensed momentary current need not be accurate because the sensed current Is can be used to correct for the inaccuracy. This appropriate position is in FIG. 6 across the main current path of the control FET SW2, and in FIGS. 7 and 8 across a resistance Rcu in series with the inductor L. But, other appropriate positions are possible, such as for example in series with the sync FET SW1.

The sense circuit 100 has two inputs coupled to receive the voltage VSW2 across the drain-source path of the control FET SW2, and an output to supply the current information SI. The information SI is representative of the current ISW2 through the main current path of the control FET SW2.

The sense circuit 101 has two inputs coupled across the resistor R1 and an output to supply the difference signal FD as a difference current. The difference current FD is representative of the difference between the reference signal VID and the actual value of the output voltage Vo: FD=Gm1×(VID−Vo).

The sense circuit 102 has two inputs coupled to receive the voltage Vs across the sense resistor Rs, and an output to supply the current information FI as information current. The information current FI is representative of the current Is through the sense resistor Rs: FI=Gm2×Rs×Is. The difference of the information current FI and the difference current FD is integrated in the capacitor 103 to obtain the correction voltage CS.

The multiplier 105 receives the information SI form the sense circuit 100 and supplies corrected information CSI to the input of the amplifier AM5 which is not connected to the resistor R2. The multiplier 105 multiplies the information or signal SI by a correction factor indicated by the correction voltage CS. Thus, the level at this input of the amplifier AM5 is not the inaccurate current information SI as found in the prior art, but is corrected with the correction signal CS of the correction loop such that the more accurate current information CSI is compared with the level at node N2.

Alternatively, the multiplier 105 may be inserted in series with the resistor R2 as shown in FIG. 5. The multiplier 105 may also by connected to the input of the amplifier AM5 to control the signal at this input in amplitude.

It has to be noted that the momentary current information SI to be used in the fast control loop of the power converter is obtained by using the Rds-on of the control FET SW2 which is an inaccurate sense resistor. A more accurate resistor Rs is used to determine via the slow correction loop the correction factor for the fast control loop. The correction factor may be applied to the momentary information SI (as is shown in FIG. 6) or to the difference signal FD (as is shown in FIG. 5). The correction loop is relatively slow with respect to the control loop because the capacitor 103 performs an integrating action. This integrating action provides a better average value of the current Is in the power converter and lowers the influence of parasitic disturbances. Thus, the correction factor is determined such that the inaccuracy of the momentary current can be compensated or at least decreased. Again, the integrator 103 may of course comprise a more complex circuit than a single capacitor.

FIG. 7 shows a current-controlled down-converter in accordance with an embodiment of the invention. FIG. 7 shows the implementation of the inventive idea shown in FIG. 4 on the down-converter topology shown in FIG. 3. The same items as in FIG. 3 have the same references. With respect to the power converter shown in FIG. 3, a sense circuit 100, a sense circuit 101, a sense circuit 102, a capacitor 103, a capacitor Ce and a multiplier 105 are added.

As in FIG. 6, the capacitor Ce is arranged between the junction of the control FET SW2 and the sense resistor Rs. In a practical implementation, this capacitor Ce has a large value. The current Is in FIG. 7 is an average current, and is not representative of the momentary current through the inductor L. To obtain a fast response of the control loop of the power converter, the momentary current through the inductor L is sensed across a resistance Rcu in series with the inductor L. The resistance Rcu may, for example, be a copper track on the printed circuit board, or a track or a bonding wire of an integrated circuit. It is not required that the voltage Vcu across the resistance Rcu is sensed accurately. The inaccurate sensing can be compensated for by the correction loop which generates the correction signal CS.

The sense circuit 100 has two inputs coupled to receive the voltage Vcu across the resistance Rcu, and an output to supply the momentary current information SI. The information SI is representative of the current Iu through the resistance Rcu.

The sense circuit 101 has two inputs coupled across the resistor R1 and an output to supply the difference signal FD as a difference current. The difference current FD is representative of the difference between the reference signal VID and the actual value of the output voltage Vo: $FD=Gm1 \times (VID-Vo)$.

The sense circuit 102 has two inputs coupled to receive the voltage Vs across the sense resistor Rs, and an output to supply the current information FI as information current. The information current FI is representative of the current Is through the sense resistor Rs: $FI=Gm2 \times Rs \times Is$. The difference of the information current FI and the difference current FD is integrated in the capacitor 103 to obtain the correction voltage CS.

The multiplier 105 receives the information SI form the sense circuit 100 and supplies corrected information CSI to the input of the amplifier AM5 which is not connected to the resistor R2. The multiplier 105 multiplies the information or signal SI with the correction factor g indicated by the correction voltage CS. Thus, the level at this input of the amplifier AM5 is not the inaccurate current information SI of the prior art but is corrected with the correction signal CS of the correction loop such that the more accurate current information CSI is compared with the level at node N2.

Alternatively, the multiplier 105 may be inserted in series with the resistor R2 as shown in FIG. 8.

It has to be noted that the momentary current information SI to be used in the fast control loop of the power converter is obtained by using the resistance Rcu as an inaccurate sense resistor. A more accurate resistor Rs is used to determine via the slow correction loop the correction factor for the fast control loop. The correction factor may be applied to the momentary information SI (as is shown in FIG. 7) or to the difference signal FD (as is shown in FIG. 8). The correction loop is relatively slow with respect to the control loop because the capacitor 103 performs an integrating action. This integrating action provides a better average value of the current Is in the power converter and lowers the influence of parasitic disturbances. Thus, the correction factor is determined such that the inaccuracy of the momentary current can be compensated or at least decreased.

FIG. 8 shows a current-controlled down-converter in accordance with an embodiment of the invention. This power converter is based on the power converter shown in FIG. 7. The multiplier 105 is now inserted in series with the resistor R2, as is also shown in FIG. 5. The same correction action is obtained as with the circuit shown in FIG. 7. It does not matter which of the two input signals of the amplifier AM5 is corrected with the control signal CS. What counts is at what instant the signal SI or CSI which represents the momentary current or the corrected momentary current, reaches the level FD or the corrected level CFD. If the sensed momentary current is too large, the correction loop will generate a correction signal CS to decrease the amplitude of the momentary current with a multiplier which receives the sensed momentary current SI to supply the corrected sensed momentary current with a smaller amplitude. Or, the correction loop will generate a correction signal CS to increase the difference level FD by multiplying it by the correction factor to obtain a corrected difference level CFD with a higher level. Thus, depending on the position of the multiplier, the correction factor CS should correct in the opposite direction. Further, it is possible to correct in both paths. Now the correction factor CS may change in opposite directions in the two paths, but it is also possible that the signals in both paths change in the same direction but with different correction factors, such that a total correction is obtained fitting the correction factor CS.

FIG. 9 shows a multi-phase current-controlled down-converter in accordance with an embodiment of the invention. FIG. 9 shows two current controlled down-converters SMPSa and SMPSb which are operated in parallel. Each one of the two power converters SMPSa and SMPSb is based on the power converter shown in FIG. 4. Comparable items have an index a or b depending on whether they are part of, respectively, the first or the second of the two power converters SMPSa and SMPSb. The sensing of the input current Is, and the sensing of the difference voltage VID−Vo are performed only once. Inaccurate current sensing over the main current paths of the control FETs SW2a and SW2b is performed in every power converter. Alternatively, the currents in the separate converters SMPSa and SMPSb may be sensed in another way, which need not be accurate. The mistake in the fast control loop which is caused by using these inaccurately sensed currents is minimized by the slow correction loop. This slow loop integrates the difference of the difference voltage FD and the information signal FI which represents the accurately sensed current IS to obtain a correction signal CS. The correction signal CS is used to correct a signal in the fast control loop. In the embodiment in accordance with the invention shown in FIG. 9, the amplitude of the information SIa and SIb representing the inaccurately sensed currents are corrected with the correction signal CS. But, alternatively, the difference voltage FD which is supplied to the switch controllers 104*a* and 104*b* may be corrected. This latter implementation allows for a single multiplier circuit instead of two (105*a*+115*b*) and also reduces the amount of electronics in the fast signal path.

This embodiment in accordance with the invention requires only a single, inexpensive (?) and non-cumbersome (?) accurate measuring operation to be carried out to determine the total current drawn by the power converters. The current sensing within each of the power converters can be performed in a simple, inexpensive manner.

The dual phase power converter comprises a series arrangement of an input inductor Li and a sense resistor Rs arranged between an input of the dual phase power converter and a node Na. A DC-voltage Vi is received at the input of the dual phase power converter. A smoothing capacitor Ce is arranged between the node Na and ground. The dual phase power converter has an output to provide an output voltage Vo across the parallel arrangement of a smoothing capacitor Co and the load Ro.

The power converter SMPSa comprises a series arrangement of main current paths of a control FET SW2*a* and a sync FET SW1*a* arranged between the node Na and ground. The gate signal Qa controls the control FET SW2*a*, and the gate signal Qia controls the sync FET SW1*a*. An inductor L1*a* is coupled between the output of the first power converter SMPSa and the junction of the main current paths of the control FET SW2*a* and the sync FET SW1*a*. The power converter SMPSa supplies the output current Ioa.

The power converter SMPSb comprises a series arrangement of main current paths of a control FET SW2*b* and a sync FET SW1*b* arranged between the node Na and ground. The gate signal Qb controls the control FET SW2*b*, and the gate signal Qib controls the sync FET SW1*b*. An inductor L1*b* is coupled between the output of the first power converter SMPSb and the junction of the main current paths of the control FET SW2*b* and the sync FET SW1*b*. The power converter SMPSb supplies the output current Iob.

A power converter controller 10 comprises all the functions required to sense the currents and voltages needed to control both the first and the second power converter SMPSa and SMPSb and supplies the gate signals Qa, Qia, Qb, Qib.

The sense circuit 101 senses the output voltage Vo and supplies the difference signal FD which represents the difference of the reference voltage VID and the actual value of the output voltage Vo. The sense circuit 102 senses the voltage Vs across the sense resistor Rs to supply the information FI which represents the current Is through the sense resistor Rs. The integrator 103 integrates the difference of the difference signal FD and the information FI to supply the control signal CS.

The sense circuit 100*a* senses the voltage across the Rds-on of the control FET SW2*a* to supply the sense information SIa which represents the momentary current ISW2*a* through the main current path of the control FET SW2*a* The multiplier 105*a* multiplies the sense information SIa by a correction factor determined by the control signal CS to obtain the corrected sense information CSIa. The switch controller 104*a* detects when the corrected sense information CSIa reaches the difference level indicated by the difference signal FD to supply the inverse gate signals Qa and Qia to switch off the control FET SW2*a* and to switch on the sync FET SW1*a*. Usually, the switch controller 104*a* comprises a set-reset flip-flop (not shown in FIG. 9) which is reset when the corrected sense information CSIa reaches the difference level FD. The non-inverting output of this flip-flop supplies the gate signal Qa, the inverting output supplies the gate signal Qia.

The sense circuit 100*b* senses the voltage across the Rds-on of the control FET SW2*b* to supply the sense information SIb which represents the momentary current ISW2*b* through the main current path of the control FET SW2*b*. The multiplier 105*b* multiplies the sense information SIb by a correction factor determined by the control signal CS to obtain the corrected sense information CSIb. The switch controller 104*b* detects when the corrected sense information CSIb reaches the difference level indicated by the difference signal FD to supply the inverse gate signals Qb and Qib to switch off the control FET SW2*b* and to switch on the sync FET SW1*b*. Usually, the switch controller 104*b* comprises a set-reset flip-flop (not shown in FIG. 9) which is reset when the corrected sense information CSIb reaches the difference level FD. The non-inverting output of this flip-flop supplies the gate signal Qb, the inverting output supplies the gate signal Qib.

Thus, both power converters SMPSa and SMPSb are controlled by inaccurately sensed momentary currents ISW2*a* and ISW2*b*. However, this inaccuracy is corrected for by using a single accurate measurement of the current Is of the total power converter.

FIG. 10 shows a circuit diagram of a current controlled down-converter in accordance with an embodiment of the invention. The power converter is a peak-current-mode controlled down-converter including load line regulation. A DC-input voltage Vi is received across a series arrangement of a sense impedance Z2 and the main current paths of a control FET SW2 and a sync FET SW1. The sense impedance Z2 is arranged between the DC-input voltage Vi and the series arrangement of the main current paths of the control FET SW2 and the sync FET SW1. A series arrangement of an inductor L and a sense impedance Z1 is arranged between the junction of the main current paths and the output of the power converter which supplies the output voltage Vo. A capacitor Co is connected to the output of the power converter.

The sense impedance Z1 preferably is a discrete resistor and allows a momentary current sensing. By momentary current sensing is meant that the shape and the value of the voltage V1 across the sense impedance Z1 is sufficiently accurate to be able to be used in the fast control loop which regulates the power converter. The sense impedance Z2 preferably is a very accurate resistor. The voltage sensed across this resistor is used in the slow control loop to correct the inaccuracy caused in the fast control loop.

The fast control loop comprises the operational amplifiers AM1, AM2, AM3 and the set-reset flip-flop SRFF. The amplifier AM1 has inputs connected across the sense impedance Z1 and thus senses the voltage V1 caused by the current I1 flowing through the sense impedance Z1. The voltage across the sense impedance Z1 is influenced by parasitic effects such as caused by a series inductance of the sense impedance Z1. If the amplifier AM1 has an amplification factor A1, the output voltage SI of this amplifier AM1 is the multiplication of A1, Z1 and I1. The gain A1 of the amplifier AM1 is controllable by the control signal CS1. Usually, the amplifier AM1 comprises a multiplier M1 to obtain the gain control of the input signal V1. The amplifier AM2 has an inverting input connected to the output of the power converter to receive the output voltage Vo, a non-inverting input to receive a reference voltage VID and an output to supply the output voltage FD. The reference voltage VID is selected to be the no-load voltage of the power converter dictated by the required load line, apart from an offset introduced due to the application of the peak-current-mode control principle. This effectively implies a no-load output voltage unequal to the reference voltage VID. Known measures such as the insertion of a compensation voltage- or current-source proportional to the ripple current value can be applied for making the no-load output voltage equal to VID. This deviation is corrected with the offset determining circuit OM1 as will be discussed later. If the amplifier AM2 has an amplification factor A2, the output voltage is FD=A2 (VID−Vo).

Thus, the output voltage SI of the amplifier AM1 is the momentary information on the current I1 through the sense impedance Z1, and the output voltage FD is the difference signal.

The amplifier AM3 has an inverting input to receive the difference signal FD, a non-inverting input to receive the momentary information SI, and an output to supply a reset signal RS. The amplification factor of the amplifier AM3 is A3. The set-reset flip-flop SRFF has a reset input R which receives the reset signal RS, a set input S which receives a clock signal CLK, a non-inverting output Q coupled to the gate of the control FET SW2, and an inverting output Qi coupled to the gate of the sync FET SW1.

The power converter further comprises an amplifier AM4 which has inputs connected across the sense impedance Z2 and an output to supply the information FI on the current I2 through the sense impedance Z2. The amplifier AM5 has an input to receive the information FI, an input to receive the difference signal FD, and an output to supply a difference signal SD via the switch SE1 to either the low pass filter LF1 or the low pass filter LF2. The low pass filter LF1 supplies the control signal CS1 to the multiplier M1 of the amplifier AM1. The low pass filter LF2 supplies the control signal CS2 to the offset determining circuit OM1. The offset determining circuit OM1 is coupled between a supply voltage Vdd and the output of the amplifier AM1 and supplies a current Ico to correct a DC level of the momentary information SI. A load determining circuit SCC receives the difference signal FD, a first reference difference level FDR1, a second reference level FDR2 and supplies a control signal SWS1 to the switch SE1. The amplifier AM4 has an amplification factor A4 and the amplifier AM5 has an amplification factor A5.

The operation of the power converter shown in FIG. 10 is elucidated hereinbelow.

Let it first be assumed that the slow correction loop, which comprises the amplifiers AM4 and AM5, the loop filters LF1 and LF2, the load determining circuit SCC, the switch SE1, the offset determining circuit OM1 and the multiplier M1, is inactive.

Again, the fast control loop controls the switch off instant of the control FET SW2 by resetting the flip-flop SRFF at the instant the momentary information SI reaches the level of the difference signal FD. The amplifier AM1 supplies the momentary information SI which provides momentary information on the current I1 in the power converter. The level of this momentary current SI need not be accurate. The difference signal FD which is also referred to as the droop voltage Vdr=VID−Vo indicates the load situation of the power converter. The amplifier AM3 compares the value of the current I1 with the droop voltage Vdr and switches off the control FET SW2 if the value of the current I1 reaches the droop voltage Vdr. Or, in other words, the control FET SW2 is switched off at the instant a predetermined level of the current I1 exists at a predetermined droop voltage Vdr. Thus, the power converter is controlled such that the required load line is obtained. However due to inaccuracies in the measurement of the current I1 and inaccuracies in the fast circuits of the fast control loop an error will occur in the load line. This error is corrected by the slow control loop.

The slow control loop senses the current I2 through the accurate resistor Z2 with the amplifier AM4 to supply the information FI. The difference of this information FI and the droop voltage Vdr (which is the difference signal FD) is integrated to obtain the control signals CS1 and CS2. This can be obtained in many ways. In the embodiment shown in FIG. 10, the amplifier AM5 determines the difference of the information FI and the difference signal FD to obtain the difference signal SD. The difference signal SD is supplied to the loop filter LF1 or the loop filter LF2 dependent on the load situation of the power converter. The loop filters LF1, and LF2 are low pass filters which comprise the integrating function.

The load determining circuit SCC checks the load situation of the power converter. This may be performed in many ways. In the embodiment in accordance with the invention shown in FIG. 10 the difference signal FD, which is also referred to as the droop voltage Vdr, indicates the load situation of the power converter. If the droop voltage Vdr is large, the load on the power converter is large. It is also possible to check the level of the output voltage Vo or of the output current Io or the input current I2. The difference signal FD is compared with the first reference level FDR1 and with the second reference level FDR2. The first reference level FDR1 is below the second reference level FDR2.

If the difference signal FD is below a particular level LI2 (see FIG. 13) which determines the first reference level FDR1, the power converter is considered to operate in a relatively low load situation wherein a relatively small output power is supplied. In low load situations, the load determining circuit SCS supplies the control signal SWS1 to the switch SE1 such that the difference signal SD is supplied to the second loop filter LF2 to obtain the control signal CS2 which controls the offset determining circuit OM1.

If the difference signal FD is above a particular level LI3 which determines the second reference level FDR2, the power converter is considered to operate in a relatively high load situation wherein a relatively high output power is supplied. In high load situations, the load determining circuit SCS supplies the control signal SWS1 to the switch SE1 such that the difference signal SD is supplied to the first loop filter LF1 to obtain the control signal CS1 which controls the multiplier M1.

Thus, at low loads, the slow control loop corrects the DC-offset of the load line, at high loads, the slow control loop corrects the slope of the load line. The circuits of the slow loop can be more accurate because they may have a lower bandwidth than the circuits of the fast loop. Further, due to the averaging function of the integrator/loop filters LF1, LF2, parasitic disturbances on the current I2 are filtered. Preferably, the sense impedance Z2 is an accurate sense resistor arranged in the input line of the power converter. In the input line of the power converter, the current I2 is relatively small compared to the current I1 and a relatively small resistor Z2 suffices. In FIG. 10, no measures are indicated for initialization of the converter during start-up of the system. This may involve setting of signal levels at a predetermined value as well as application of a start-up protocol. The latter may be either organized in the power converter itself or provided by an external controller. It is common with power supplies that additional measures are applied for proper start-up and shut-down of the power supply to fulfill the specific requirements of the application. These measures are required for circuit initialization as well as protection of the power converter itself and the load.

FIG. 11 shows a circuit diagram of a current controlled down-converter in accordance with an embodiment of the invention. FIG. 11 is based on FIG. 6; the same references indicate the same items which operate in the same manner. Compared to the power converter shown in FIG. 6 there are added: the load determining circuit 1032, the switch SE2, the offset determining circuit OM2. Further, the capacitor 103 is replaced by the two capacitors 1030 and 1031.

In the power converter of FIG. 6, the inaccuracy of the fast control loop is decreased by using the slow control loop. The fast control loop comprises the amplifiers 101, AM4 and AM5, and supplies a reset signal RS which determines a switch-off instant of the control FET SW2. The control FET SW2 is switched off at the instant the momentary current ISW2 reaches the level of the difference signal FD. The slow control loop comprises the amplifier 102, the integrating capacitor 103 and the multiplier 105.

The capacitor Ce is arranged at the junction of the control FET SW2 and the sense resistor Rs. In practice, this capacitor Ce has a large value since it serves for the local decoupling of the supply voltage. The current ISW2 is a pulsed current, it is substantially zero when the control FET SW2 is open, and it is substantially equal to the current through the inductor L if the control FET SW2 conducts. The current ISW2 is thus a momentary current during the period in time the control FET SW2 conducts. The current Is is an average current, and is not representative of the momentary current through the inductor L. This current Is cannot be used in the fast control loop which regulates the power converter, the response of the power converter would become too slow. To obtain a fast response the momentary current through the inductor L is sensed at an appropriate position. This sensed momentary current need not be accurate because the sensed current Is can be used to correct for the inaccuracy. This appropriate position is in FIG. 11 across the main current path of the control FET SW2, and in FIGS. 7 and 8 across a resistance Rcu in series with the inductor L. But, other appropriate positions are possible, such as for example in series with the sync FET SW1.

The sense circuit 100 has two inputs coupled to receive the voltage VSW2 across the drain-source path of the control FET SW2, and an output to supply the current information SI. The information SI is representative of the current ISW2 through the main current path of the control FET SW2.

The sense circuit 101 has two inputs coupled across the resistor R1 and an output to supply the difference signal FD as a difference current. The difference current FD is representative of the difference between the reference signal VID and the actual value of the output voltage Vo: FD=Gm1×(VID−Vo), wherein Gm1 is the gain factor of the amplifier 101.

The sense circuit 102 has two inputs coupled to receive the voltage Vs across the sense resistor Rs, and an output to supply the current information FI as information current. The information current FI is representative of the current Is through the sense resistor Rs: FI=Gm2×Rs×Is, wherein Gm2 is the gain factor of the amplifier 102. The difference of the information current FI and the difference current FD is now integrated in either the capacitor 1030 to obtain the correction voltage CS2 or in the capacitor 1031 to obtain the correction voltage CS1.

The load determining circuit 1032 checks the load situation of the power converter. This may be performed in many ways. In the embodiment in accordance with the invention shown in FIG. 11 the level of the output voltage Vo indicates the load situation of the power converter. If the level of the output voltage Vo is relatively low, the load on the power converter is relatively large. The level of the output voltage Vo is compared with the first reference level Vr1 and with the second reference level Vr2. The first reference level Vr1 is below the second reference level Vr2.

If the difference signal FD is below a particular level LI2 (see FIG. 13) which determines the first reference level Vr1, the power converter is considered to operate in a relatively low load situation wherein a relatively small output power is supplied. In low load situations, the load determining circuit 1032 supplies the control signal SWS2 to the switch SE2 such that the current information FI and the difference current FD are supplied to the capacitor 1030 which operates as an integrator/loop filter to obtain the control signal CS2 which controls the offset determining circuit OM2 to supply an offset current Ico. In the embodiment in accordance with the invention shown in FIG. 11, the offset current Ico is drawn from the junction of the resistor R1 and the main current path of the switch SW3. However, this offset current determining circuit OM2 may be connected to any node where it influences the switch off instant of the control FET SW2. The required polarity of the offset current Ico has to be selected to obtain an improved accuracy of the load line at low loads.

If the difference signal FD is above a particular level LI3 which determines the reference level Vr2, the power converter is considered to operate in a relatively high load situation wherein a relatively high output power is supplied. In high load situations, the load determining circuit 1032 supplies the control signal SWS2 to the switch SE2 such that the current information FI and the difference current FD are supplied to the capacitor 1031 which operates as an integrator/loop filter to obtain the control signal CS1 which controls the multiplier M2. The multiplier M2 may be positioned at a different position as shown. The function of the multiplier M2 is to alter the gain in the fast control loop such that the switch off instant of the control switch SW2 becomes more accurate at high loads on the power converter.

Thus, at low loads, the slow control loop corrects the DC-offset of the load line, at high loads, the slow control loop corrects the slope of the load line. The circuits of the slow loop can be more accurate than the circuits of the fast loop because they may have a lower bandwidth. Further, due to the averaging function of the integrator/capacitors 1030, 1031, parasitic disturbances on the current ISW2 are filtered. Preferably, the sense impedance Rs is an accurate sense resistor arranged in the input line of the power converter. In the input line of the power converter, the current Is is relatively small compared to the current ISW2 and a relatively small resistor Rs suffices.

It has to be noted that the momentary current information SI to be used in the fast control loop of the power converter is obtained by using the Rds-on of the control FET SW2 which is an inaccurate sense resistor. A more accurate resistor Rs is used to determine via the slow correction loop the correction factors for the fast control loop. At low loads, the slow loop corrects the offset in the fast control loop, at high loads, the slow loop corrects the gain errors in the fast control loop. The correction factors may be applied to the momentary information SI (as is shown in FIG. 6) or to the difference signal FD (as is shown in FIG. 5). The correction loop is relatively slow with respect to the control loop because the capacitor 103 performs an integrating action. This integrating action provides a better average value of the current Is in the power converter and lowers the influence of parasitic disturbances. Thus, the correction factor is determined such that the inaccuracy of the momentary current can be compensated or at least decreased. The integrating capacitors 1030 and 1031 may comprise a more complex circuit than a single capacitor.

The switch SE2 has three positions, in position a, the currents FI and FD are supplied to the capacitor 1030, in position c, the currents FI and FD are supplied to the capacitor 1031, and in position b, the currents are supplied to ground. This will be elucidated with respect to FIG. 13.

FIG. 12 shows load line tolerances. The dashed line UL shows the specified upper limit of the output voltage Vo as a function of the output current Io. The dashed line LL shows the specified lower limit of the output voltage Vo as a function of the output current Io. In practice, tolerances yield a spread in no-load output voltage and slope of the load line. An actually realized load line ALL1 may start, for a zero output current Io, at the output voltage value Vosu. Another actually realized load line ALL2 may start, for a zero output current Io, at the output voltage value Vos1. The slopes of the realized load lines ALL1 and ALL2 differ.

It has to be noted that both load lines ALL1 and ALL2 have a DC-offset. The starting value Vosu and Vos1 do not coincide with the value Vos which is the average value of the zero current values of the lines UL and LL. Further, it has to be noted that the slopes of both load lines ALL1 and ALL2 differ from the slopes of the lines UL and LL.

These different load lines ALL1, ALL2 may occur in different power converters due to spread on the nominal components, and may also occur in the same power converter due to aging or temperature effects.

Due to the DC-offset and slope tolerances of the realized load lines ALL1, ALL2, the power converter has a load line behavior which is within specification up to the output current level Ib only. The tolerances on the load line should be minimized to cover a more severe specification with respect to the area the load line should be in, or with respect to a higher output current Io required. If the specification becomes tighter, the lines UL and LL are nearer to each other and the power converter will be out of (?) spec at a lower output current Io than Ib. If the power converter has to supply a higher current than Ib, it is clear that the tolerances on the load line should become lower.

The present invention decreases the tolerance on the DC-offset and/or the slope of the load line by using the accurate slow control loop to correct the tolerances of the inaccurate fast control loop.

FIG. 13 shows the operation of the slow control loop dependent on the load condition of the power converter. FIG. 13 shows the positions of the switch SE2 of FIG. 11 as a function of the output load OL. The output load of the converter may be determined by comparing the level of the output voltage Vo, or the droop voltage Vdr, or the output current Io with at least one reference level. If only one reference level is used, below the reference level, the power converter is considered to be in the low load situation, above the reference level the power converter is considered to be in the high load situation. In the embodiment in accordance with the invention shown in FIG. 13, a more complex load situation determination is shown.

The switch SE2 is in position a wherein the currents FI and FD are integrated on the capacitor 1030 if the output load OL is between the levels LI1 and LI2, thus at relatively low output loads OL. The switch SE2 is in position c wherein the currents FI and FD are integrated on the capacitor 1031 if the output load OL is between the levels LI3 and LI4, thus at relatively high output loads OL. The switch SE2 is in position b wherein the currents FI and FD are dumped and not used to contribute to the control signals CS1 or CS2. Thus, the slow control loop uses the output loads OL between the levels LI1 and LI2 to determine the DC-offset correction. The slow control loop uses the output loads OL between the levels LI3 and LI4 to determine the slope or gain correction as elucidated with respect to FIG. 14.

It may be required to disable the DC-offset adjustment at very low load levels to restrict the offset requirements at very low load levels. The adjustment loop receives the droop voltage Vdr and the load current Io as input signals. If the load current is zero, both the droop voltage Vdr and the load current Io are zero and the adjustment loop would be controlled to incorrect values. The transition regions shown may be zero or may be curved. The slanted transition lines shown indicate that (?) output loads OL occurring during these transition lines contribute partly only. It demonstrates that the loop need not necessarily be opened and closed using ideal switches SE as depicted in FIGS. 10 and 11. Signal transfer such that (?) the adjustment loop is gradually opened or closed can e.g. be arranged with the application of a so-called long-tailed transistor pair and a single reference.

FIG. 14 shows the offset and slope adjustment of the load line with the slow control loop. The area OA indicates the area of the load line when the DC-offset correction is operative. This area is near to the zero output current Io axis, and thus, a correction on the level of the load line in this area substantially results in a DC-offset of the load line. The area SA indicates the area of the load line when the slope correction is operative. This area corresponds to relatively high values of the output current Io, and thus, a correction on the level of the load line in this area substantially results in a change of the slope of the load line. The area SA may start at a certain current value and may extend beyond the full load of the power converter.

It should be noted that the above-mentioned embodiments illustrate rather than limit the invention, and that those skilled in the art will be able to design many alternative embodiments without departing from the scope of the appended claims.

For example, the momentary information SI may also be obtained across a resistor which is arranged in series with the main current path of the sync switch SW1. The switches are preferably FET's, but may be bipolar transistors or other controllable semiconductor devices. The inductor L may be a transformer. The multipliers may be separate circuits, or may be constructed as an amplifier with a controllable gain. The multipliers may have an offset.

The invention is useful in all power converters in which an accurate current has to be sensed for providing a well defined load line behavior. The power converter may be current controlled or voltage controlled.

It should be noted that a structural shift of the load line occurs due to the use of the peak current instead of the average current. This shift is known if the inductance, the voltages and the switching frequency of the converter are known, and thus can be substantially corrected by a predetermined fixed amount.

Due to tolerances and other disturbing factors, an unknown and variable offset occurs which may be corrected. Preferably, the correction circuit for this offset is active at low output currents. The slope of the load line may also have a deviation from the desired value. The slope may be corrected with the multiplier. Preferably, the slope correction is active at high output currents. Consequently, in an embodiment in accordance with the invention wherein both the offset and the slope are corrected, two integrating functions are required. These integrating functions may use the same circuit parts.

For example, in an analog implementation with capacitors, two capacitors may be provided to store the integrating values for the shift correction loop and the slope correction loop separately. In a digital implementation, for example, a single integrator may be present which is used in time-multiplex. The different integrator values which determine the adjustment signals are stored, preferably in a non-volatile memory. In the latter case, these values can later on be used for initialization during start-up of the converter.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A load line regulated switched mode power converter for supplying an output voltage and an output current to a load, the switched mode power converter comprising:
   an inductor, a switch coupled to the inductor, a first impedance, a second impedance, and
   a power converter controller including:
      a first sense circuit for obtaining momentary information on a first current flowing through the first impedance, the first current being related to the output current,
      means for determining a difference between a zero load voltage and the output voltage to obtain a difference signal,
      a second sense circuit for obtaining further information on a second current flowing through the second impedance, the second current being related to the first current,
      an integrator for integrating a difference between the further information and the difference signal to obtain a correction signal, and
      a switch controller for receiving the difference signal, the momentary information and the correction signal to control the switch for obtaining a substantially zero correction signal in a steady state, the switch controller including:
      a driver for receiving a first driver signal and a second driver signal to operate the switch when a level of the first driver signal reaches a level of the second driver signal, and
      means for receiving the correction signal for correcting either:
         (i) the momentary information to obtain corrected momentary information, wherein the first driver signal is the corrected momentary information and the second driver signal is the difference signal, or
         (ii) the difference signal to obtain a corrected difference signal, wherein the first driver signal is the momentary information and the second driver signal is the corrected difference signal, or
         (iii) the momentary information to obtain corrected momentary information and the difference signal to obtain a corrected difference signal, wherein the first driver signal is the corrected momentary information and the second driver signal is the corrected difference signal.

2. A switched mode power converter as claimed in claim 1, wherein the means for receiving the correction signal comprises a multiplier receiving the difference signal and the correction signal to supply a multiplied difference signal as the corrected difference signal.

3. A switched mode power converter as claimed in claim 1, wherein the means for receiving the correction signal comprises a multiplier receiving the momentary information and the correction signal to supply multiplied momentary information as the corrected momentary information.

4. A switched mode power converter as claimed in claim 1, wherein the means for receiving the correction signal comprises means for introducing an offset receiving the difference signal and the correction signal to supply the corrected difference signal having an offset.

5. A switched mode power converter as claimed in claim 1, wherein the means for receiving the correction signal comprises means for introducing an offset receiving the momentary information and the correction signal to supply the corrected momentary information having an offset.

6. A switched mode power converter as claimed in claim 2, wherein the power converter controller comprises a load determining circuit for supplying a load signal indicating whether a load condition of said power converter is above a first predetermined load condition and a window circuit for controlling the integrator to determine the correction signal only during a period in time the load signal indicates that the load condition is above the first predetermined load condition to obtain predominantly a correction of a slope of the load line.

7. A switched mode power converter as claimed in claim 4, wherein the power converter controller comprises a load determining circuit for supplying a load signal indicating whether a load condition of said power converter is below a second predetermined load condition, and a window circuit for controlling the integrator to determine the correction signal only during a period in time the load signal indicates that the load condition is below the second predetermined load condition to obtain predominantly a DC-shift of the load line.

8. A switched mode power converter as claimed in claim 1, wherein:
   the means for receiving the correction signal comprises a multiplier receiving:
      (i) the difference signal and a first correction signal to supply the corrected difference signal being a multiplied difference signal, or
      (ii) the momentary information and the first correction signal to supply the corrected momentary information being multiplied momentary information,
   the means for receiving the correction signal further comprises means for introducing an offset receiving:
      (i) the difference signal and a second correction signal to supply the corrected difference signal being the difference signal having an offset, or
      (ii) the momentary information and the second correction signal to supply the corrected momentary information being the momentary information having an offset,
   the power converter controller comprises a load determining circuit for supplying a load signal indicating whether a load condition of said power converter is above a first predetermined load condition or below a second predetermined load condition and a window circuit for controlling the integrator to determine the first correction signal only during a period in time the load signal indicates that the load condition is above the first predetermined load condition, and to determine the second correction signal only during a period in time the load signal indicates that the load condition is below the second predetermined load condition, and wherein the first predetermined load condition is higher than the second predetermined load condition.

9. A switched mode power converter as claimed in claim 7, wherein said power converter comprises storage means for storing the first correction signal and the second correction signal.

10. A switched mode power converter as claimed in claim 6, wherein the load condition is determined by the level of the output voltage, or by the level of the difference signal or by the output current or by a current related to the output current.

11. A load line regulated switched mode power converter for supplying an output voltage and an output current to a load, the switched mode power converter comprising:

an inductor, a switch coupled to the inductor, a first impedance, a second impedance, and a power converter controller including:

a first sense circuit for obtaining momentary information on a first current flowing through the first impedance, the first current being related to the output current, means for determining a difference between a zero load voltage and the output voltage to obtain a difference signal, the means for determining the difference comprises a third resistor arranged between a reference voltage and the output voltage to obtain a difference voltage across the third resistor the difference signal being related to the difference voltage.

a second sense circuit for obtaining further information on a second current flowing through the second impedance, the second current being related to the first current, the second sense circuit is arranged for supplying an information current being related to the voltage across or the current through the second impedance, an integrator for integrating a difference between the further information and the difference signal to obtain a correction signal, the integrator comprises a capacitor for integrating the difference current and the information current to obtain the correction signal and a switch controller for receiving the difference signal, the momentary information and the correction signal to control the switch for obtaining a substantially zero correction signal in a steady state.

12. A load line regulated switched mode power converter for supplying an output voltage and an output current to a load, the switched mode power converter comprising:

an inductor, a switch coupled to the inductor, a first impedance, a second impedance, and a power converter controller including:

a first sense circuit for obtaining momentary information on a first current flowing through the first impedance, the first current being related to the output current, means for determining a difference between a zero load voltage and the output voltage to obtain a difference signal, a second sense circuit for obtaining further information on a second current flowing through the second impedance, the second current being related to the first current, an integrator for integrating a difference between the further information and the difference signal to obtain a correction signal, and a switch controller for receiving the difference signal, the momentary information and the correction signal to control the switch for obtaining a substantially zero correction signal in a steady state, and wherein the means for determining the difference comprises a third resistor arranged between a reference voltage and the output voltage to obtain a difference voltage across the third resistor the difference signal being related to the difference voltage, wherein the power converter is a down-converter comprising a series arrangement of main current paths of the first mentioned switch and a further switch the inductor being arranged between a junction of the main current paths and an output of the power converter, a smoothing capacitor is coupled to a terminal of the main current path of the first mentioned switch directed towards the input of the power converter, and the second impedance is arranged between the input of the power converter and the main current path of the first mentioned switch;

wherein:

the means for determining the difference is arranged to supply a difference current being related to the voltage across, or a current through the third resistor, the second sense circuit is arranged for supplying an information current being related to the voltage across or the current through the second impedance, and the integrator comprises a capacitor for integrating the difference current and the information current to obtain the correction signal.

* * * * *